US008224830B2

(12) United States Patent
Bidlack

(10) Patent No.: US 8,224,830 B2
(45) Date of Patent: Jul. 17, 2012

(54) SYSTEMS AND METHODS FOR MANIPULATION OF INEXACT SEMI-STRUCTURED DATA

(75) Inventor: Clint Bidlack, Pasadena, CA (US)

(73) Assignee: ActivePrime, Inc., Pasadena, CA (US)

( * ) Notice: Subject to any disclaimer, the term of this patent is extended or adjusted under 35 U.S.C. 154(b) by 291 days.

(21) Appl. No.: 11/908,885

(22) PCT Filed: Mar. 17, 2006

(86) PCT No.: PCT/US2006/010007
§ 371 (c)(1),
(2), (4) Date: Sep. 2, 2008

(87) PCT Pub. No.: WO2006/102227
PCT Pub. Date: Sep. 28, 2006

(65) Prior Publication Data
US 2009/0234826 A1 Sep. 17, 2009

Related U.S. Application Data

(60) Provisional application No. 60/663,393, filed on Mar. 19, 2005.

(51) Int. Cl.
*G06F 17/30* (2006.01)
(52) U.S. Cl. ........................................................ 707/758
(58) Field of Classification Search .................. 707/609, 707/705, 958, 802
See application file for complete search history.

(56) References Cited

OTHER PUBLICATIONS

Sung-Hyuk Cha, Use of Distance Measures in Handwriting Analysis, 2001, State University of New York at Buffalo, pp. 1-208.*
Jie Wei, Markov Edit Distance, 2004,IEEE, pp. 311-321.*
Ukkonen E: "Approximate string-matching with q-grams and maximal matches" Theoretical Computer Science Netherlands, vol. 92, No. 1, (Jan. 6, 1992), pp. 191-211.
Navarro G: "A Guided Tour to Approximate String Matching" ACM Computing Surveys, ACM, New York, NY, US, vol. 33, No. 1, (Mar. 1, 2001), pp. 31-88.
Owolabi O et al: "Fast Approximate String Matching" Software Practice and Experience, Wiley and Sons, Bognor Regis, GB, col. 18, No. 4 (Apr. 1988), pp. 387-393.
International Search Report (PCT/US06/010007).

* cited by examiner

*Primary Examiner* — Fred I Ehichioya

(57) ABSTRACT

The data constraint framework solution of the present invention addresses data quality issues by standardizing, verifying, matching, consolidating and merging data records using powerful inexact matching logic and search reduction technologies. The data conditioning framework uses these technologies to more efficiently condition data to improve the quality of data and/or resolve quality data issues such as incomplete, inaccurate and duplicate data records. For example, the data conditioning framework is used to "cleanse" incorrect, incomplete and duplicate data from a data source, such as an information system. The data conditioning framework uses the following approximate searching and matching techniques to improve the efficiency of the approximate matching, reduce the search space for approximate matching, and improve the speed of executing approximate searches and matches: 1) inexact trimmed matching, 2) adaptive search ordering, 3) cascading search space reduction, 4) tiered and metric indexing, and 5) domain knowledge matching.

19 Claims, 20 Drawing Sheets

SYSTEMS AND METHODS FOR MANIPULATION OF INEXACT SEMI-STRUCTURED DATA

CROSS-REFERENCE TO RELATED APPLICATIONS

The present application claims the benefit under 35 U.S.C. 371 of International Application No. PCT/US2006/010007 (published PCT application No. WO 2006/10227 A2), filed Mar. 17, 2006, which claims priority to U.S. Provisional Application No. 60/663,393, filed Mar. 19, 2005. The entire contents of each of the above-referenced applications are incorporated herein by reference.

TECHNICAL FIELD

The present invention generally relates to searching and matching inexact data. More particularly, the present invention relates to techniques for more efficiently performing approximately searching and matching of data records.

BACKGROUND INFORMATION

Companies store and manage data in a wide variety of data sources, such as information systems and databases. For example, a company may store and manage customer related data in a customer relationship management (CRM) system used by multiple employees, such as sales representatives. Many data quality issues arise in such information systems and databases from human data entry errors or lack of diligence in entering or managing the data. In one case, a sales representative may enter incomplete information regarding contact information for a customer. For example, the sales representative may not include the zip code in the customer's address. In another case, another sales representative may create duplicate data by creating a second record for the same customer entered by the first sales representative. For example, the sales representative may enter a nickname or different name for the company in the CRM system so that the company appears to be different than the customer record entered by another sales representative. In other cases, a sales representative may incorrectly spell a company name, a person's name or other portions of the contact information. In yet another case, a sales representative may enter the wrong address or wrong telephone number for a customer. As a result of the various ways people enter data, data sources may have a multitude of inaccurate, incomplete or duplicate data to manage and correct.

Data quality issues, such as inaccurate, incomplete, and duplicate data can be costly in time, expense, and resources. For example, a sales representative may spend hours searching through duplicate records to find the current notes and account information of a customer. As such, data quality may result in loss productivity of employees. In another example, marketing may not be able to accurately target customers and prospects because of outdated and incorrect contact information. For example, a marketing campaign may have a high number of email or mail returns from incorrect address information, a high number of duplicate mailing, or marketing information sent to an incorrect person. Thus, data quality issues may result in extra expense and missed sales, customer relationship and goodwill opportunities. In some cases, information technology (IT) personnel may be pulled away from important business matters to address the data quality issues in an information system. For example, an IT resource may be used to fix or merge duplicate records, and may work on such issues one at a time as they are reported. As a result, data quality issues may result in less efficient use of company resources and time.

Additionally, companies rely on corporate data to make many business decisions. Various company reports may be created from one or more data sources having quality issues. For example, a company may generate a report that aggregates errors and duplicates while rolling up the data into a report view. In some cases, the company must spend time, expense and resources to verify and correct the quality data issues to have an accurate report. In other cases, the company report may have quality data issues that are unknown or net yet detected. As such, the company may make business decisions on less than accurate information. The consumption of cost, time and resources related to data qualities issues are further compounded by the multiple data sources and information systems companies use, maintain and rely on for business decisions. For example, companies may have quality data issues in their accounting systems, manufacturing systems, product data and lifecycle management systems, supply chain management systems, and enterprise resource planning systems.

Therefore, systems and methods are desired to more efficiently address and improve the quality of data in data sources, such as information systems and databases.

SUMMARY OF THE INVENTION

The data conditioning framework solution of the present invention addresses data quality issues by standardizing, verifying, matching, consolidating and merging data records using powerful inexact matching logic and search reduction technologies. The data conditioning framework uses these technologies to more efficiently condition data to improve the quality of data and/or resolve quality data issues such as incomplete, inaccurate and duplicate data records. For example, the data conditioning framework may be used to "cleanse" incorrect, incomplete and duplicate data from a data source, such as an information system. The data conditioning framework provides the following approximate searching and matching techniques to improve the efficiency of the approximate matching, reduce the search space for approximate matching, and improve the speed of executing approximate searches and matches: 1) inexact trimmed matching, 2) adaptive search ordering, 3) cascading search space reduction, 4) tiered and metric indexing, and 5) domain knowledge matching.

In one aspect, the present invention is related to a method for reducing a set of strings to approximately match to a first string by determining an edit distance between the first string and the set of strings is within a predetermined threshold. The method includes the steps of receiving a request to approximately match a first string with a set of strings using a predetermined edit distance, and generating a difference histogram based on a distribution of a difference in a number of occurrences of each character in the first string and a second string of the set of strings. The method determines via the difference histogram a first count of the number of occurrences of each character of the first string not in the second string is greater than a predetermined threshold, and identifies the second string as having an edit distance greater than the predetermined edit distance in response to the determination.

In one embodiment, the method includes skipping an approximate match of the first string to the second string in response to the determination. In another embodiment, the method includes determining via the different histogram a second count of the number of occurrences of each character of the second string not in the first string is greater than the predetermined threshold, and identifying the second string as having an edit distance greater than the predetermined edit distance in response to the determination. In some embodiments, the method determines the first count and the second count are less than the predetermined threshold and performs an approximate match of the first string to the second string using the predetermined edit distance. In one embodiment, the method includes terminating execution of an approximate match of the first string with a string of the set of strings upon an edit distance of the approximate match reaching the predetermined threshold. In some embodiments, the method determines the first string and the second string are the same and identifies the second string as having an edit distance of zero. In yet another embodiment, the method includes setting one of the predetermined edit distance or the predetermined threshold based on a percentage of number of characters of the first string.

In other embodiments, the first string or the second string may identify a person, an institute or a location. In some embodiments, the first string or the second string represents data of one of the following systems: 1) accounting, 2) manufacturing, 3) customer relationship management, 4) enterprise resource planning, 5) product data management, 6) product lifecycle management, 7) supply chain management, 8) bioinformatics system and 9) lab information management system. In one embodiment, the characters of the first string or the second string includes a letter, a digit, or a symbol.

In another aspect, the present invention is related to a method for ordering a plurality of match criteria for approximately matching a first data set to a second data set based on execution times of the match criteria. The method includes the steps of receiving a request to approximately match strings of a first data set to strings of a second data set using a plurality of match criteria, and identifying a subset of the first data set. The method determines an execution time of an approximate search of the subset of the first data set to the second data set for each of the plurality of match criteria, and ranks the plurality of match criteria in an order based on the determination.

In one embodiment, the method includes ranking the plurality of match criteria in the order from a faster execution time to a slower execution time. In another embodiment, the method includes performing an approximate match of the first data set to the second data set in accordance with the ranked plurality of match criteria. In some embodiments, the plurality of match criteria includes a field and corresponding predetermined threshold for approximately matching a string with the field. In other embodiments, the plurality of match criteria includes a first field and a first corresponding predetermined threshold logically conducted with a second field and a second corresponding predetermined threshold. In yet another embodiment, the plurality of match criteria includes a multiple match criteria. In one embodiment, the multiple match criteria has a first match criteria logically disjuncted with a second match criteria.

In other embodiments of this method, strings of the first data set or second data set may identify a person, an institute or a location. In some embodiments, strings of the first data set or second data set represent data of one of the following systems: 1) accounting, 2) manufacturing, 3) customer relationship management, 4) enterprise resource planning, 5) product data management, 6) product lifecycle management, 7) supply chain management, 8) bioinformatics system and 9) lab information management system.

In some aspects, the present invention is related to a method for reducing a number of records to search for approximately matching a string to a data set of records using a plurality of match criteria by cascading a search result from a first match criteria to a subsequent match criteria. The method includes receiving a request to perform an approximate match of a first string to records of a data set using a plurality of match criteria. The method determines a first set of one or more records of the data set approximately matching the first string based on a first match criteria of the plurality of match criteria, or a second set of one or more records of the data set not approximately matching the first string based on the first match criteria. The method also includes providing the first set or the second set of records to an approximate match search using a subsequent match criteria of the plurality of match criteria.

In one embodiment, the method determines a third set of records approximately matching the first string based on an approximate match of the first string to one of the first set or the second set of records using the subsequent match criteria. In some embodiments, the first match criteria or the subsequent match criteria includes a field and corresponding predetermined threshold for approximately matching a string with the field. In other embodiments, the method includes ranking the plurality of match criteria in an order from a faster execution time to a slower execution time. In one embodiment, the method performs an approximate match of the string to the data set in accordance with the ranked plurality of match criteria. In some embodiments, the plurality of match criteria include a field and corresponding predetermined threshold for approximately matching a string with the field. In another embodiment, one of the plurality of match criteria includes a first field and a first corresponding predetermined threshold logically conducted with a second field and a second corresponding predetermined threshold. In another embodiment, one of the match criteria is a multiple match criteria. In some embodiments, the multiple match criteria has a first match criteria logically disjuncted with a second match criteria.

In other embodiments of this method, strings of the first data set or second set of records may identify a person, an institute or a location. In some embodiments, strings of the first or second set of records represent data of one of the following systems: 1) accounting, 2) manufacturing, 3) customer relationship management, 4) enterprise resource planning, 5) product data management, 6) product lifecycle management, 7) supply chain management, 8) bioinformatics system and 9) lab information management system.

In another aspect, the present invention is related to a method for reducing a number of records to search for approximately matching a string to records of a data set using a plurality of metric indexes. The method includes receiving a request to perform an approximate match of a string to records of a data set, and identifying an ordered list of a plurality of metric indexes. Each of the metric indexes includes an index to a record of the data set based on a metric. The method also includes determining a first approximate search of the string in the records of the data set using a first metric index of the plurality of metric indexes returns a matching result; and executing a second approximate search of the string in the records of the data set using a second metric index of the plurality of metric indexes in response to the determination.

In one embodiment, the method may include not executing, or otherwise skipping, the second approximate search if the first approximate search returns no matching results. In some embodiments, the first metric index or the second metric index comprises a sized based index. In another embodiment, a key of the sized based index comprises a string length and a value associated with the key includes a record of the data set having the string length. In other embodiments, the first metric index or the second metric index includes a first character index or a last character index. In one embodiment, a key of the first character index includes a character, and a value associated with the key comprises a record of the data set starting with the character. In another embodiment, a key of the last character index includes a character, and a value associated with the key comprises a record of the data set ending with the character. In some embodiments, the method also includes ordering the list of the plurality of metric indexes based on a time of execution of approximately searching a subset of strings of a first data set with the records of the data set.

In yet another aspect, the present invention is related to a method for improving an approximate match of a string with a reference data element by approximately matching the string with one or more data elements identifying alternative representations of the reference data element. The method includes receiving a request to perform approximate matching of a string with a reference data element, and determining an approximate match of the string to the reference data element and one or more alternative data elements. The one or more alternative data elements include alternative representations of a value of the reference data element. The method also identifies as a result one of the reference data element or the alternative data elements having the approximate match within a predetermined threshold.

In one embodiment, the method includes identifying the result having the closest match within the predetermined threshold. In some embodiments, the method includes identifying the reference data element as the result having the approximate match within the predetermined threshold. In other embodiments of this method, one of the string, the reference data element, or the one or more alternative data elements may identify a person, an institute or a location. In some embodiments, one of the string, the reference data element, or the one or more alternative data elements represent data of one of the following systems: 1) accounting, 2) manufacturing, 3) customer relationship management, 4) enterprise resource planning, 5) product data management, 6) product lifecycle management, 7) supply chain management, 8) bioinformatics system and 9) lab information management system.

In some embodiments, the reference data element includes an abbreviation of a state, and the one or more alternative data elements include alternative representations of identifying the state. In one embodiment, the reference data element includes an abbreviation of a country, and the one or more alternative data elements comprise alternative representations of identifying the country. In another embodiment, the reference data element includes a zip code, and the one or more alternative data elements include a city associated with the zip code. In other embodiments, the reference data element includes a portion of an address, and the one or more alternative data elements include alternative representations of the portion of the address. In some embodiment, the reference data element includes a type of business, and the one or more alternative data elements include alternative representations of the type of business. In yet another embodiment, the reference data element includes a portion of a city name, and the one or more alternative data elements include alternative representations of the portion of the city name. In one embodiment, the reference data element includes a name of a company, and the one or more alternative data elements include alternative representations of the name of the company. In another embodiment, the reference data element includes a secondary address unit designator, and the one or more alternative data elements include alternative representations of the secondary address unit designator.

The details of various embodiments of the present invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIGS. 8A-8H are diagrammatic views of eight screens of a graphical user interface wizard in one embodiment of using the data conditioning framework;

FIG. 9A is a diagrammatic view of a standardization user interface for practicing another embodiment of the data conditioning framework;

FIG. 9C is a diagrammatic view of a merge operation user interface for practicing another embodiment of the data conditioning framework.

DETAILED DESCRIPTION

Certain illustrative embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiments of the systems and methods of the data conditioning framework described herein provide for efficiently performing approximate matching or searching of a first set of one or more data records with a second set of one or more data records, such as approximately matching a first string with a second string. The data conditioning framework provides the following approximate searching and matching techniques: 1) inexact trimmed matching, 2) adaptive search ordering, 3) cascading search space reduction, 4) tiered and metric indexing, and 5) domain knowledge matching.

These various techniques improve the efficiency of the approximate matching, reduce the search space for approximate matching, and improve the speed of executing approximate searches and matches and returning search and match results. The data conditioning framework uses these techniques to more efficiently condition data to improve the quality of data and/or resolve quality issues with data. For example, the data conditioning framework in one example application is used to cleanse incorrect, incomplete and duplicate data from a data source, such as an information system.

Figure 1A:
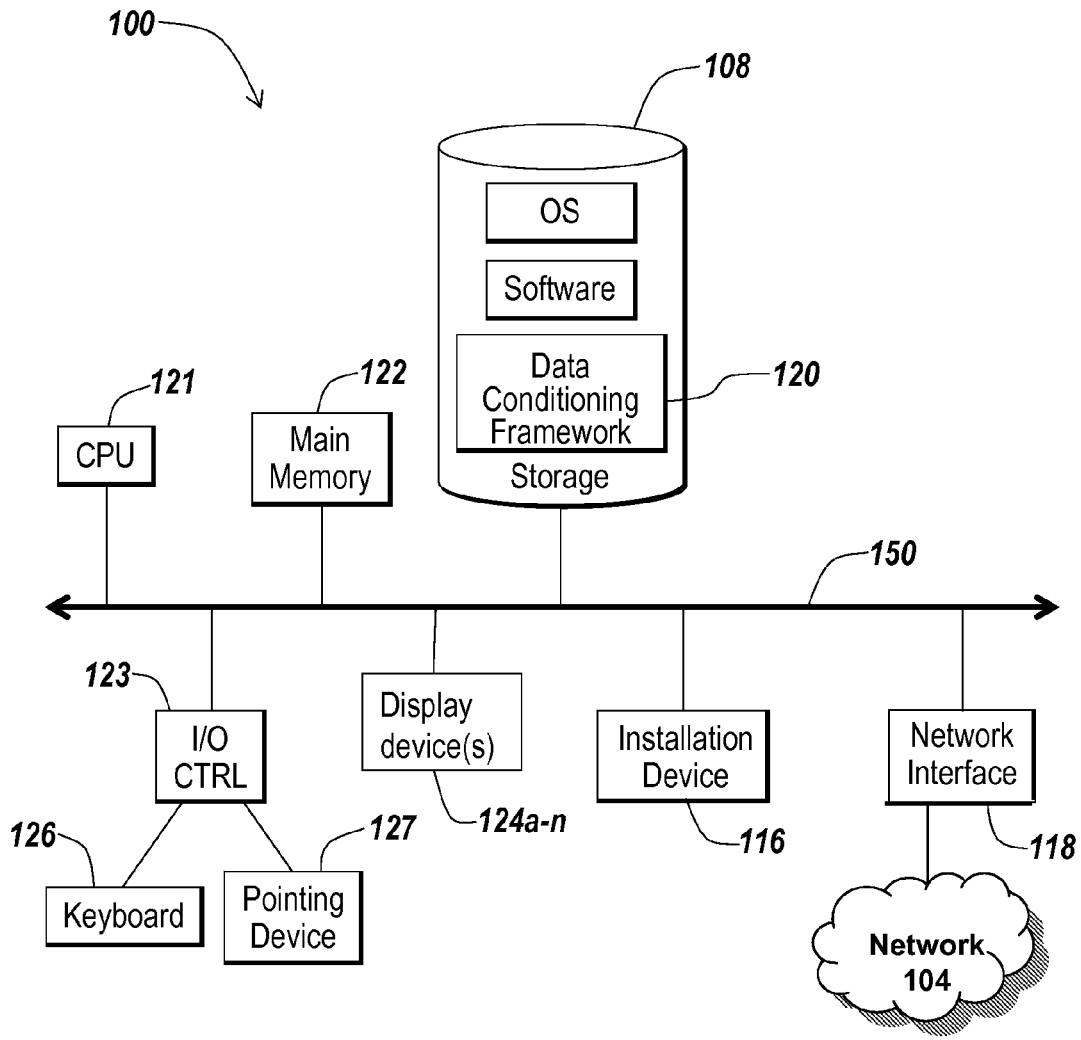
FIGS. 1A and 1B are block diagrams of embodiments of a computing device for practicing an embodiment of the present invention.
Figure 1B:
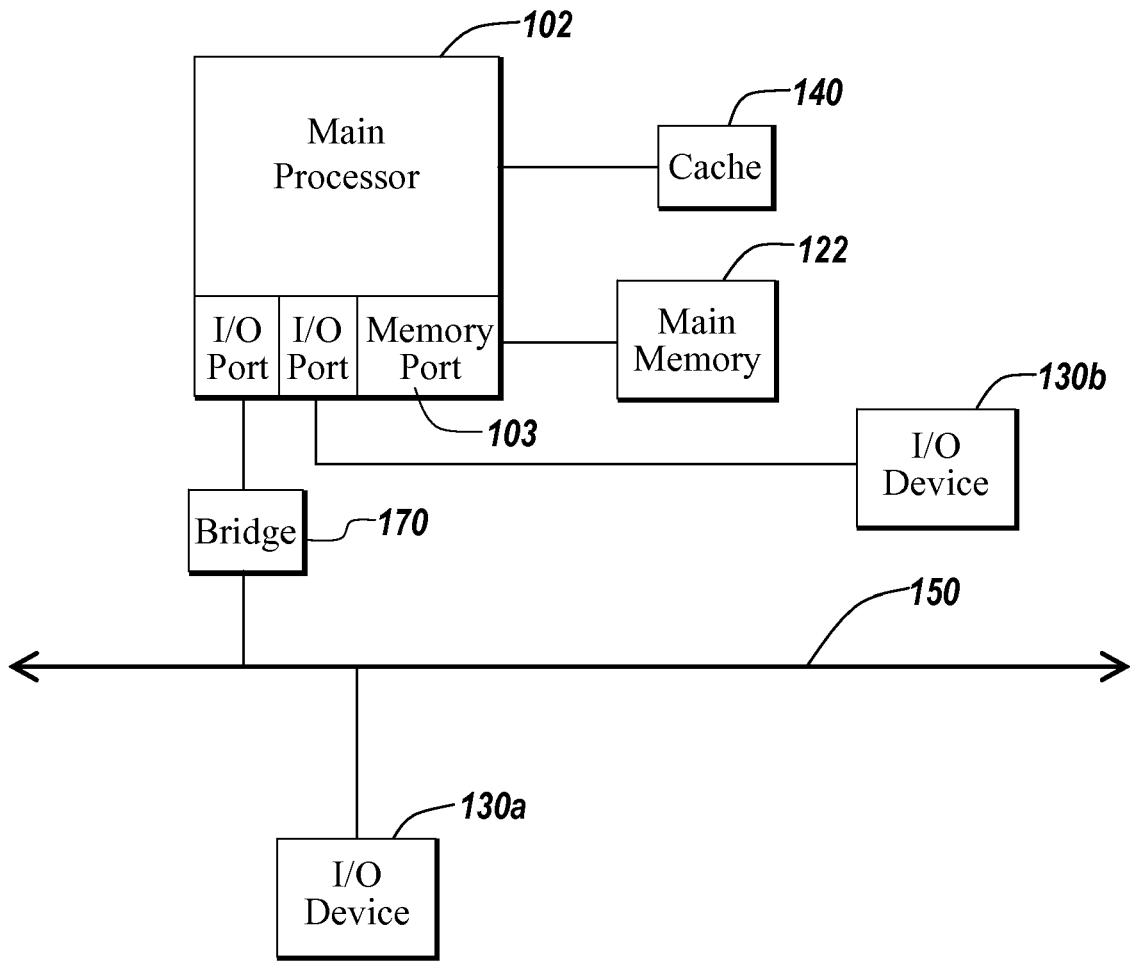

FIGS. 1A and 1B depict block diagrams of a computing device 100 useful for practicing an embodiment of the data conditioning framework. Referring to FIGS. 1A and 1B, the computing device 100 includes a central processing unit 102, and a main memory unit 122. As shown in FIG. 1A, a typical computing device 100 may include a visual display device 124, a keyboard 126 and/or a pointing device 127, such as a mouse. In some embodiments, the visual display device 124 and any related hardware and/or software supports and is capable of displaying high-definition video as described in detail further herein. Each computing device 100 may also include additional optional elements, such as one or more input/output devices 130a-130b (generally referred to using reference numeral 130), and a cache memory 140 in communication with the central processing unit 102.

The central processing unit 102 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. In some embodiments, the CPU 102 may comprise a single core, dual core, or multi-core processor. The computing device 100 may be based on any of these processors, or any other processor capable of operating as described herein.

Main memory unit 122 may be one or more memory chips capable of storing data and allowing any storage location to be directly accessed by the microprocessor 102, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 102 communicates with main memory 122 via a system bus 150 (described in more detail below). FIG. 1A depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 102 communicates directly with cache memory 140 via a secondary bus, sometimes referred to as a backside bus. In other embodiments, the main processor 102 communicates with cache memory 140 using the system bus 150. Cache memory 140 typically has a faster response time than main memory 122 and is typically provided by SRAM, BSRAM, or EDRAM.

In the embodiment shown in FIG. 1A, the processor 102 communicates with various I/O devices 130 via a local system bus 150. Various busses may be used to connect the central processing unit 102 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 102 may use an Advanced Graphics Port (AGP) to communicate with the display 124. FIG. 1B depicts an embodiment of a computer 100 in which the main processor 102 communicates directly with I/O device 130b via HyperTransport, Rapid I/O, or InfiniBand. FIG. 1B also depicts an embodiment in which local buses and direct communication are mixed: the processor 102 communicates with I/O device 130a using a local interconnected bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software, programs, data or files, such as any software 120, or portion thereof, related to the data conditioning framework described herein.

The computing device 100 may also include a storage device 128 of any type and form for storing an operating system and other related software, and for storing application software programs such as any program related to the data conditioning framework 120. In one embodiment, the storage device 128 includes one or more hard disk drives or redundant arrays of independent disks. In other embodiments, the storage device 128 comprises any type and form of portable storage medium or device, such as a compact flash card, a micro hard drive or pocket drive, embedded flash storage, or USB storage drive. Portable storage devices may be generally referred to by a variety of names, including but not limited to, finger drive, flash disk, flash drive, flash memory drive, jump drive, jump stick, keychain drive, keydrive, memory key, mobile drive, pen drive, thumb drive, thumb key, vault drive, USB drive, or USB stick. Optionally, any of the installation devices or mediums 116 could also provide a storage medium or device 128. For example, a CD-R, CD-RW, or DVD-R, DVD-RW may store the portable user environment 120.

As depicted in FIG. 1A, the computing device 100 may include a network interface 118 to interface to a network 104 through a variety of connections including, but not limited to, standard telephone lines, LAN or WAN links (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, T1, T3, 56 kb, X.25 and direct asynchronous connections), broadband connections (e.g., ISDN, Frame Relay, ATM), wireless or WiFi connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

The network 104 can be any type and form of network. The network 104 can be a local-area network (LAN), such as a company Intranet, a metropolitan area network (MAN), or a wide area network (WAN), such as the Internet or the World Wide Web. The topology of the network 104 may be a bus, star, or ring network topology. The network 104 and network topology may be of any such network or network topology capable of supporting the operations of the present invention described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen.

Furthermore, an I/O device 130 may also provide storage 128 and/or an installation medium 116 for the computing device 100. For example, an I/O device 130 may provide a connection to receive any type and form of portable storage device 128. In still other embodiments, the computing device 100 may provide USB connections to receive handheld USB storage devices such as the USB Flash Drive line of devices manufactured by Twintech Industry, Inc. of Los Alamitos, Calif.

In one embodiment, the computing device 100 may provide a USB connection to receive a media storage device, such as an iPod device manufactured by Apple Computer of Cupertino, Calif.

In other embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device and in accordance with embodiments further described herein. The computing device 100 can be any workstation, desktop computer, laptop or notebook computer, server, handheld computer, mobile telephone or other portable telecommunication device, media playing device, a gaming system, or any other type and/or form of computing, telecommunications or media device that is capable of communication and that has sufficient processor power and memory capacity to perform the operations described herein. For example, the computing device 100 may comprise a device of the ipod family of devices manufactured by Apple Computer of Cupertino, Calif., a Playstation 2, Playstation 3, or Personal Playstation® Portable (PSP) device manufactured by the Sony Corporation of Tokyo, Japan, a Nintendo DS™ or Nintendo Revolution™ device manufactured by Nintendo Co., Ltd., of Kyoto, Japan, or a Xbox™ or Xbox 360™ device manufactured by the Microsoft Corporation of Redmond, Wash.

Figure 2A:
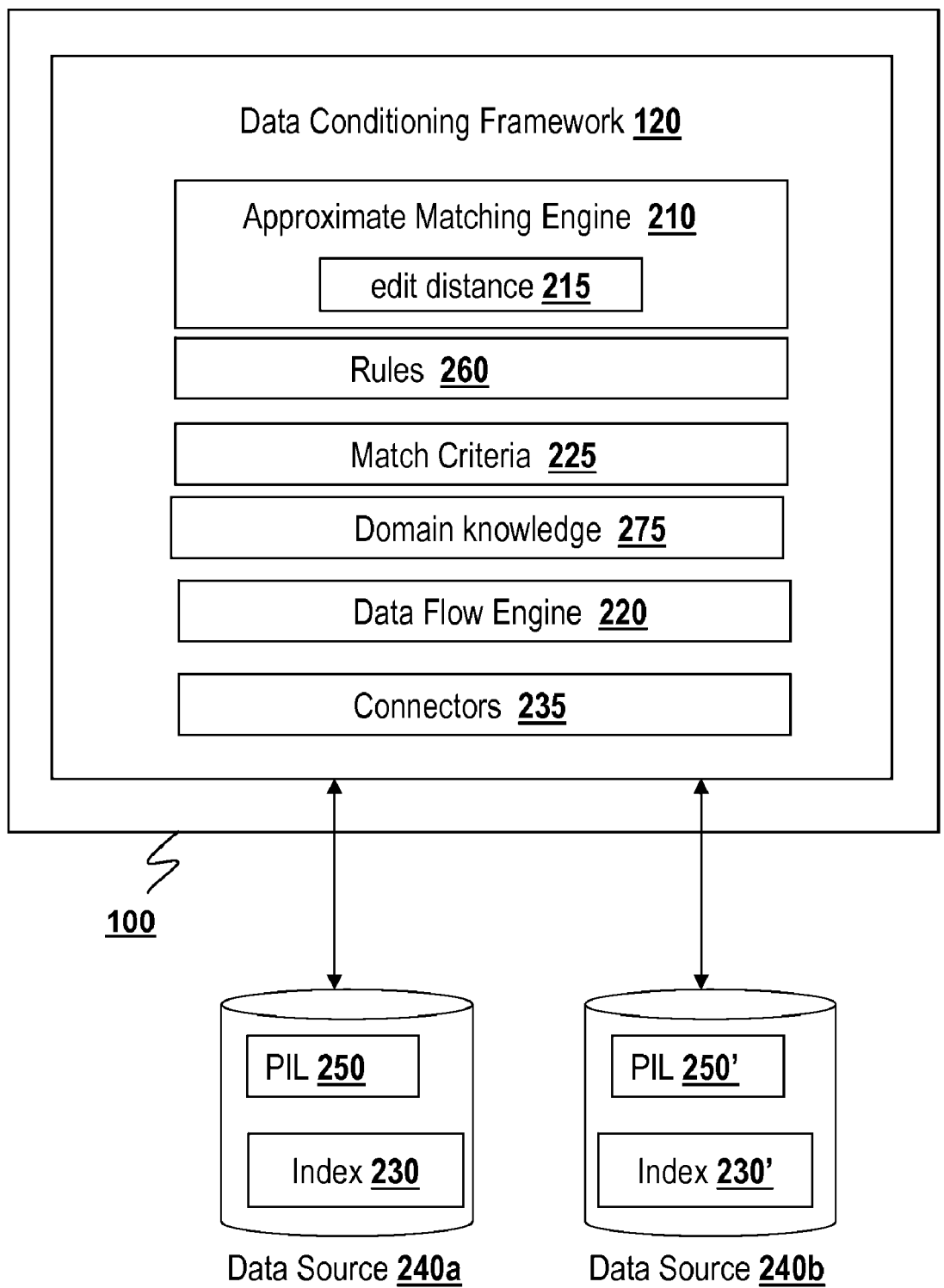
FIG. 2A is a block diagram of a data conditioning framework for practicing an embodiment of the present invention.

FIG. 2A illustrates an embodiment of the data conditioning framework 120 for practicing the approximate matching and searching techniques. In brief overview, the data conditioning framework 120, sometimes referred to as the DCF or also as a data constraint framework, resides, executes, or is otherwise provided on computing device 100. The data conditioning framework 120 includes an approximate matching engine 210 and a data flow engine 220. In one embodiment, the approximate matching engine 210 uses an edit distance 214 in performing an approximate match, such as between two strings. The approximate matching engine 210 may also use one or more match criteria 225 to perform an approximate match or search. The data conditioning framework 120 also may include one or more connectors 235 for interfacing, connecting or communicating with one or more data sources 240a-240b. The data sources 240a-240b may include a first set of one or more strings to be approximately matched with a second a set of one or more strings. For example, in one embodiment, the data sources 240a-240b may include data or information identifying a person, an institute or location, generally referred to herein as PIL 250, 250'. The data sources 240a-240b may also be associated with one or more indexes 230, 230', such as a metric based index.

In further detail, the approximate matching engine 210 includes any logic, function or operations to compare and/or match a first record with one or more second records, such as a first string with one or more second strings. The approximate matching engine 210 may comprise software, hardware, or any combination of software and hardware. In one embodiment, the approximate matching engine 210 performs exact matching such as comparing a first string to a second string to determine if the strings are the same. In another embodiment, the approximate matching engine 210 performs approximate matching of a first string to a second string. Approximate matching may also be referred to as inexact matching. In some embodiments, approximate or inexact matching includes comparing a first string to a second string to determine if one or more differences between the first string and the second string are with a predetermined or desired threshold. If the determined differences are less than or equal to the predetermined threshold, the strings may be considered to be approximately matched. For example, a first string of "America" may be approximately matched to a second string of "American" as the strings are different by one character.

In one embodiment, the approximate matching engine 210 performs an approximate match by determining the number of corrections or changes needed to be made to the first string in order for the first string to exactly match or be transformed into the second string, or vice-versa, e.g., second string to the first string. In some embodiments, the number of corrections or changes comprises a number of inserts, a number of substitutions or replacements, a number of deletions and/or a number of edits to transform a first string into a second string, or vice-versa. In one embodiment, the number of corrections or changes is referred to as the edit distance 215. In some embodiments, the edit distance 215 is the Levenshtein distance or edit distance as used in the Levenshtein algorithms and calculations known to those skilled in the art for determining if a first string approximately or inexactly matches another string. The edit distance 215 may be represented or identified by any type and form of data and/or information. In some embodiments, a number or quantity identifies the edit distance 215.

The approximate matching engine 210 may be designed and constructed to use or perform any type and form of approximate or inexact matching algorithm. In one embodiment, the approximate matching engine 210 uses an adaptation or implementation of the Levenshtein inexact matching algorithm. In another embodiment, a Damerau-Levenshtein distance is uses as an extension of the Levenshtein distance that counts transposition as a single edit operation. In other embodiments, a Hamming distance is also used in the case of strings of the same length. For two strings s and t, the Hamming distance, H(s, t) is the number of places in which the two string differ, i.e., have different characters. In yet another embodiment, the approximate matching engine 210 uses dynamic programming techniques to perform inexact string matching.

In other embodiments, the approximate matching engine 210 uses any type and form of fuzzy logic to inexactly match strings. For example, the approximate matching engine 210 may use a bitap algorithm, also known as the shift- or, shift-and or Baeza-Yates-Gonnet algorithm, as a fuzzy string searching algorithm. In this embodiment, the bitap algorithm tells whether a given text contains a substring which is "approximately equal" or approximately matches a given pattern. In one embodiment, the approximate equality is defined in terms of Levenshtein or edit distance. For example, if the substring and pattern are within a given distance of each other, then the algorithm considers them equal. In one embodiment, the bitap algorithm begins by precomputing a set of bitmasks containing one bit for each element of the pattern. Then the bitap algorithm performs of the work with bitwise operations, which may further improve performance of the approximate matching engine 210.

In another embodiment, the approximate matching engine 210 uses any type and form of pattern matching to inexact matching. In one embodiment, the approximate matching engine 210 uses any decision trees or graph node techniques for performing an approximate match. In yet another embodiment, the approximate matching engine 210 may use any custom or proprietary algorithm or logic. In some embodiments, the approximate matching engine 210 may be designed and constructed to perform a plurality of approximate matching algorithms, alone or in combination. Any of these embodiments may also include implementation of boundaries and/or conditions to improve the performance or efficiency of the inexact matching algorithm.

Although the approximate or inexact matching may be generally described in terms of strings, a string may include one or more characters, symbols, letters, numbers or digits, or any combination thereof. For example, a record of a telephone number, social security number, or a person's age may include all numbers but may be approximately matched in accordance with the operations described herein. Additionally, the data conditioning framework 120 or application implementing the data conditioning framework 120 may implement or use any type of data structures, string-based, non-string based (e.g., integer), or otherwise, in a programming or scripting language to represent any fields, records, values or strings to be approximately matched.

Additionally, the data conditioning framework 120 may be discussed in terms of performing an approximate or inexact search. In some embodiments, an approximate search comprises performing a search of a set of data records, such as data source 240b, for one or more strings that approximately match a first string, such as a string from data source 240a. In one embodiment, the approximate search is executing an approximate match of a first string to each of a set of strings to determine if the first string approximately matches any of the set of strings. In some cases, the approximate search may result in no approximate matches between the first string and any of the set of strings.

The data conditioning framework 120 and/or approximate matching engine 210 may use one or more match criteria 225. In one embodiment, a match criteria 225 identifies a criteria, condition or other factor for approximately or inexactly matching one record with another record. In some embodiments, the match criteria 225 identifies a portion of a record, such as field or set of fields for which an approximate match is to be performed. For example, the match criteria 225 may identify a first name, last name, phone number or address field of a contact record. In another example, the match criteria 225 may identify the names of table columns or database fields for which to use in approximate matching. In other embodiments, the match criteria 225 identifies a portion of a string or one or more strings for which to perform approximate matching. The match criteria 225 may identify the predetermined or desired threshold by which one string is determined to not approximately match another string. For example, in one embodiment, the match criteria 225 identifies an edit distance threshold by which the fields, or portions of the record are not considered an approximate match if the edit distance calculation is greater than the desired or predetermined threshold. In some embodiments, the predetermined threshold of the match criteria 225 may identify a percentage. For example, the percentage may indicate the number of characters of the string by which the two strings may be different and be considered an approximate match.

The match criteria 225 may be identified via any type and form of language, syntax, or constructs readable, interpretable or understandable by the approximate matching engine 210. In some embodiments, the match criteria 225 may include any logical operators, or representation thereof, such as the logical AND or logical OR operators. In other embodiments, the match criteria 225 includes any operators to perform string manipulation, such as the concatenation or truncation of strings. The match criteria 225 may be also be formed via any textual or graphical mechanism. In one embodiment, a text editor may be used to create the match criteria 225. In another embodiment, a graphical user interface may be designed and constructed to enable a user to select, create, configure or modify one or more match criteria 225. In some embodiments, the match criteria 225 may be stored in one or more files, data sources 240, an application, program or other electronic forms. In other embodiments, the approximate matching engine 210 includes a match criteria rules engine for creating, providing, managing and using one or more match criteria 225.

In some embodiments and by way of example, a match criteria 225 includes a field and/or a threshold for matching one record with another record. For example, a match criteria 225, sometimes referred to as MC, includes a list of one or more fields and thresholds used for matching where each field is logically conjucted or ANDed, by which it may be referred. For instance, the match criteria 225 of [("First Name", 10), ("Last Name", 10), ("Phone", 20)] defines an approximate match when two records have a similar "Last Name" AND "First Name" AND "Phone". In the example match criteria 225, the thresholds for each field are 10, 10, and 20 respectively. The "First Names" and "Last Names" of the compared records can have a 10% difference between them and still be similar, or approximately matched. Likewise, the "Phone" fields of the compared records can have a 20% difference and be considered an approximate matched. In one embodiment, the thresholds define the threshold edit distance. In the case of the "Phone" field, any edit distance greater than 20% of the number of characters of either the first phone field or the second phone field indicates that the values are not similar. The match criteria 225 may include any number of fields, such as any positive number. In some embodiments, the data conditioning framework 120 and/or approximate matching engine 210 may identify a minimum and/or maximum number of fields per match criteria, or in combination among a plurality of match criteria 225. Thresholds of the match criteria can be any range of numbers, such as a positive number or range of positive numbers. In one embodiment, a threshold can be any number between 0 and 100. In some embodiments, the data conditioning framework 120 and/or approximate matching engine 210 may identify a minimum and/or maximum number of thresholds per match criteria, or in combination among a plurality of match criteria 225.

In yet another embodiment, the match criteria 225 may include a plurality of match criteria 225 grouped together or used in combination, such as via logically operators, to form a match criteria referred to as a multiple match criteria 225. In one embodiment, a multiple match criteria 225 includes a list of match criteria that are logically disjuncted or logically OR'd. For instance, in the multiple match criteria example of [[("First Name", 20)], [("Last Name", 20)]], the use of brackets identify two match criteria, each with one field and one threshold. The first match criteria of the multiple match criteria 225 identifies a criteria of the "First Name" values of the compared records have a 20% difference or less. The second match criteria of the multiple match criteria 225 identifies a criteria of the "last Name" values of the compared records have a 20% difference or less. As a result, the example multiple match criteria 225 specifies if the "First Name" values of the compared records have a 20% difference or less OR the "Last Name" values have a 20% difference or less, then the records approximately match.

Although, in the examples above, a comma within one set of brackets and between a field and threshold identifies a logical AND operation while the comma between sets of brackets is used to identify a logical OR operation, any type and form of one or more characters or symbols may be used to identify or specify a logical operator of a match criteria 225. Furthermore, although the match criteria 225 is generally described as logically AND'd and the multiple match criteria 225 as logically OR'd, the match criteria 225 may specify any combination of one or more types of logical operations for a single match criteria and/or multiple match criteria. The data conditioning framework 120 and/or approximate matching engine 210 may use a wide range of combinations of match criteria and multiple match criteria. Additionally, the match criteria 225 may be arranged or organized in any hierarchical manner.

The data conditioning framework 120, approximate matching engine 210, and/or data flow engine 220 may interface, communicate, or connect to one or more data sources 240a-240b. The data sources 240a-240b, generally referred to as data source 240, may comprise any type and form of data. In one embodiment, the data source 240 comprises a file, such as a CSV or comma-separated-value formatted file. In another embodiment, the data source 240 comprises a file having fields or values delimited in any manner by using fixed length field or any predetermined field or value delimiters. The file may have a structure, format, and/or content readable and understandable by the data conditioning framework 120, or any portion thereof. In another embodiment, the data source 240 comprises a database, such as any type and form of relational database, non-relational database, object database, or object-oriented database. In one embodiment, the data source 240 provides an Open Database Connectivity (ODBC) interface for accessing the database. In another embodiment, the data source 240 comprises a server farm of databases. In some embodiments, the data source 240 comprises a database cluster.

In other embodiments, the data source 240 comprises an application, program, software, service, process or task providing access to data. The data source 240 may provide any type and form of application programming interface (API), such as an XML, object, or web-service based interface for accessing or providing data. For example, the data source 240 may comprise an enterprise resource planning (ERP) or a customer relationship management (CRM) system. In one embodiment, the data source 240 comprises a customer relationship management system such as salesforce.com manufactured by Salesforce.com Inc. of San Francisco, Calif. In some embodiments, the data source 240 comprises any of the ERP and CRM products manufactured by Oracle of Redwood Shores, Calif. In another example, the data source 240 comprises a network accessible web service interface providing access to data, such as via an ecommerce or web-site. In yet another embodiment, the data source 240 comprises any of SaleLogix products manufactured by Sage Software Inc. of Scottsdale, Ariz. In another example, the data source 240 comprises an email or contact management system, such as Microsoft Outlook manufactured by Microsoft Corporation of Redmond, Wash.

In one embodiment, the data source 240 may comprise data or information representing a person, an institute, or a location, referred to herein as PIL 250. Data representing a person may include data identifying a person, such as one or more of the following: 1) a first name or initial, 2) a middle name or initial, 3) a last name, 4) a name suffix, 5) name prefix and 6) social security number. A name suffix may include any type and form of designator for a) social title or status, such as Jr., Sr. II, III, etc., b) academic, such as B.S., B.A., M.A, M.S., M.B.A., Ph. D., D. Phil, etc., c) honorary, such as a monarch or head of state identifier or d) professional title, such as Esq., MD, CPA, CFA, etc. The name suffix may include any one or more post-nominal letters to indicate that that individual holds a position, office, or honor. The person related data 250 may include any combination of a plurality of name suffixes or post nominal letters, which may be in any descending or ascending order. A name prefix may indicate the marital or social status of the person, such as Mr., Mrs. Ms, Mister, Madam, Honorable, King, Queen or Lord.

Data representing an institute may include data identifying a name of a company, entity, organization, corporation, partnership, foundation, group, society or any other type and form of establishment. The data may include any legal name, trade name, nickname, alias or any other alternative name for the institute. The data may also include a designator identifying the type of legal entity, such as any of the following: 1) Incorporated or Inc., 2) Corporation or Corp., 3) Limited Liability Company or LLC, 4) Limited Liability Partnership or LLP, 5) General Partnership, 6) sole proprietorship or 7) limited company or LTD. The data may also include any Standard Institute Classification (SIC) codes or any other classification codes that identify the type, category or area of business of the institute.

Data representing a location may include data identifying a position or point in physical or geographical space, such as on the earth's surface, of a person, place or thing. The location may be expressed as an absolute location or a as location relative to the position of another person, place or thing. In some embodiments, the location may be defined by coordinates or some other referencing system, such as a street address or space indexing system. In one embodiment, the location may be expressed as an address, such as a street address using any type and form of naming convention. The location may include a 1) building name, number or designator, 2) secondary unit designator 3) a street number, 4) a street name, 5) a city or town name, 6) state, 7) country, and 8) zip or postal codes. The address may include any address conventions, such as annex or alley, or any alternative designations. The secondary unit designator may identify a basement, floor, apartment, suite number or office number.

Although generally the data of the data source is generally described above in terms of people, institutes and locations, the data source and types of data used by the data conditioning framework in applying any of the techniques described herein may comprise any type of data from any type of system. In some embodiments, the data source 240 comprises any type of accounting or financial system, or data produced therefrom. For example, in one embodiment, the data source 240 comprise any version of the SAGE MAS90 accounting system manufactured by Sage Group Plc of North Park, Newcastle Upon Tyne, or data product therefrom. In another embodiment, the data source 240 comprise any version of NetSuite product manufactured by NetSuite of San Mateo, Calif., or data produced therefrom. In other embodiments, the data source 240 comprise any version of the Microsoft Dynamics-GP product manufactured the Microsoft Corporation of Redmond, Wash., or data produced therefrom.

In one embodiment, the data source 240 comprises a product data management (PDM), product information management (PIM) or a product life cycle management (PLM) system and/or data related thereto. For example, the data source 240 may comprise data identifying or describing Bill-Of-Material (BOM) information, engineering change management information, product design information, Computer Aided Design (CAD), and/or Computer Aided Manufacturing (CAM) information of one or more products. In one embodiment, the data source 240 may comprise any version of the TeamCenter product manufactured by UGS Corporation of Plano, Tex., or data produced therefrom. In another embodiment, the data source 240 may comprise any version of the mySAP PLM product manufactured by SAP AG of Waldorf, Germany, or data produced therefrom. In yet another embodiment, the data source 240 may comprise any version of the Windchill product suite manufactured by Parametric Technology Corporation (PTC) of Needham, Mass., or data produced therefrom. In some embodiments, the data source 240 may comprise any version of the Matrix products manufactured by MatrixOne of Westford, Mass., or data produced therefrom.

In another example, the data source 240 may comprise a supply chain information or management (SCM) system and/or data related thereto. For example, the data source 240 may comprise data identifying, describing or representing supplier information, and pricing, delivery and payment process information for supplies and any metric for monitoring and managing the supplier relationship. The data source 240 may comprise data identifying the goods and services used to create a product and which suppliers provide the goods and services. The data source 240 may comprise data identifying or described the receiving and verification of shipments, authorizing supplier payments, and the transfer of shipments between facilities. The data source 240 may also identify the scheduling of activities, such as manufacturing activities, for production, testing, packaging and preparation for delivery of goods and services. In some embodiments, the data source 240 may also provide data identifying, describing or representing a measurement of quality levels, production output and worker productivity related to the products, goods, and services. In another embodiment, the data source 240 may provide data identifying, describing or representing the coordination of receipt of orders from customers, development of a network of warehouses, the picking of carriers to get products to customers and the set up of an invoicing system to receive payments. In other embodiments, the data source 240 identifying, describing or representing returns in the supply chain, such as creating a network for receiving defective and excess products back from customers and supporting customers who have problems with delivered products. In one embodiment, the data source 240 may comprise any of the i2 products manufactured by i2 Technologies of Dallas, Tex., or data produced therefrom. In another embodiment, the data source 240 may comprise any of the mySCM products manufactured by SAP or data produced therefrom. In some embodiments, the data source 240 may comprise any of the Mapics products manufactured by Infor Global Solutions of Alpharetta, Ga. or data produced therefrom.

In yet another example, the data source 240 may comprise a life sciences, medical, clinical, pharmaceutical, hospital, healthcare, or lab related information system and/or data related thereto. In one embodiment, the data source 240 comprises a bioinformatics systems or data produced therefrom. In another embodiment, the data source 240 comprises a Lab Information Management System (LIMS), or data produced therefrom, such as the LabSoft LIMS products manufactured by Computing Solutions, Inc. of Evansville, Ind., any of LABSVantage products manufactured by LabsVantage Solutions of Bridgewater, N.J., any of the LABware LIMS Solutions manufactured by LabWare, Inc. of Wilmington, Del., or any of the LIMS and Lab related software manufactured by the Thermo Electron Corporation of Waltham, Mass. In some embodiments, the data source 240 and data comprises any type of spectrometry information system, clinical science diagnostic system, or any system related to the research, design, testing, manufacturing, packaging and delivery of pharmaceutical, medical devices, or any life sciences related good or service.

In some embodiments, the data conditioning framework 120 includes domain knowledge information 275 related to any of the data of the data source 240. In some embodiments, the domain knowledge information 275 comprises data identifying, describing, or representing one or more alternative or different ways to represent any data, field, value of any data element, field, and record of a data source 240. In one embodiment, the domain knowledge 275 comprises a lookup table. In another embodiment, the domain knowledge comprises a database. In other embodiments, a data source 240 comprises the domain knowledge 275. Further detail and the use of domain knowledge 275 will be described below in conjunction with FIG. 7.

The data source 240 may include or be associated with one or more indexes 230, 230' of any type and form. In some embodiments, the index 230 may be included with, in or as part of the data source 240. For example, one or more indexes 230 may be stored in the data source 240. In other embodiments, the indexes 230 may be stored in the data conditioning framework 120, such as in the approximate matching engine 210, data flow engine 220 or the rules 260 or match criteria 225. In yet another embodiment, the data conditioning framework 120 may obtain an index 230 for a data source 240 by any device, storage or location accessible via network 104. In one embodiment, an index 230 is a feature of a database that allows quicker access to a row in a table. The index may be created using one or more columns of the table, and acts a value to lookup a record in the table. In some embodiments, an index is any data structure or data element that improves the performance of lookup of a data source, such as file, database, array, object, or application. In one embodiment, the index 230 comprises a key to index to, point to or lookup a record, field or value in the data source 240. The data conditioning framework 120 may include one or more metric-based indexes or metric indexes, sometime referred to as a index. In one embodiment, a metric index 230 comprises a standard or unit of measurement type of index to access the data source. In some embodiments, a metric index 230 identifies an aspect, function, characteristic or portion to be measured related to the data of the data source 240, such as the size, type, and characteristics of any strings, or portions thereof, stored in the data source 240.

In one embodiment, the metric index 230 includes a sized-based index or size metric index, referred to as an sIndex. The sIndex is based on the size of a record, field or value of the data source 240, such as the size of a string. In one embodiment, the sIndex is created, generated or formed by storing as the key of the index the size of the strings stored in that keys value. In some embodiments, a string can be identified in the sIndex by determining the number of characters or length of the string, i.e., size, and searching those entries of the sIndex with the length. In another embodiment, the metric index 230 includes a starting or ending character metric index, referred to as an seIndex. The seIndex is created, generated or formed by storing two indexes per seIndex, called se1Index and se2Index. In one embodiment, the se1Index stores the first character as the key of the index. In other embodiments, the se1Index stores a set of leading or first characters as the index key. Strings in the data source 240 that start with the key are stored in the values at that key. The se2Index is similar to the se1Index but indexes (key) the values according to the last character or set of characters of the string of the data source 240. When searching for a string in the seIndex, the string would be searched for existence in both the se1Index and se2Index.

Still referring to FIG. 2A, the data conditioning framework 120 includes one or more connectors 235 designed and constructed to work with any type and form of data source 240a-240b or with any information system that represents or provides data. In one embodiment, the data source 240a-240b or the information system comprises information regarding people, institute or locations (PIL) 250. In some embodiments, a connector 235 is a mechanism by which the data conditioning framework 120 communicates with PIL based data sources 230, such as information systems. In one embodiment, connectors 235 are installed separately from the application using the data conditioning framework 120 and the ability to use a connector 235 is unlocked by a key code. In some embodiments, a connector 235 provide three categories of functionality: 1) user interface related functionality for allowing a user to interact with the PIL data source 240, 2) introspection capabilities which allow the application using the data conditioning framework 120 to introspect the PIL based data source 240 for internal information, and 3) data capabilities which allow the application using the data conditioning framework 120 to exchange data with the PIL based data source 240.

In one embodiment, the user interface functionality of the connector 235 includes: 1) user selection of source and target data sources 230, 2) user login, 3) query, display, and user selection of groups, 4) query and display of number of records in the group, 5) query, display, and user selection of lead sources, and 6) checking data source constraints. In some embodiments, the introspection functionality includes: 1) obtain the name of the type of data source 240, such as the name of the PIL based system, 2) obtain list of underlying person, institute, and location tables or data sources, 3) obtain list of one-to-one, many-to-one and one-to-many tables with respect to the data source 240, and 4) obtain format information for data sources. In another embodiment, the data exchange functionality includes: 1) connect and disconnect to the data source 240 and read, insert, update, delete, and/or merge data.

The data conditioning framework 120 may include one or more rules 260 comprising any type and form of syntax, language, structure and content for specifying logic, conditions, constraints, decisions, declaration or instructions to control, direct, manage or influence the behavior of the data conditioning framework 120. In one embodiment, the data conditioning framework 120 provides the user an option for selecting a type of merge rule to apply to duplicates and provides an extension for allowing new merge rules to be created and used in an application. For example, a user may select via a user interface screen of the application one of the following behaviors for merging data to create or form a master record:

| Name | Description | When is it available |
| --- | --- | --- |
| Default | This is the current behavior | All |
| Last Created | Master is record with least recent create date | CRM-CRM |
| First Created | Master is record with most recent create date | CRM-CRM |
| Last Modified | Master is record with least recent modify date | CRM-CRM |
| First Modified | Master is record with most recent create date | CRM-CRM |
| CRM | Master is the record that is the CRM entry | CSV-CRM |
| CSV | Master is the CRM entry, but the data is filled in (copied) from the first CSV entry | CSV-CRM, CSV-CSV |

Rules 260 may be configured via a user interface, such as command line or graphical user interface. Rules 260 may also be created, added or provided programmatically via one or instructions and/or an application programming interface (API). By way of example, merge rules 260 may have the following properties: 1) a unique name, which is used in the graphical user interface to select merge rules 260, 2) a location in a rule selector, 3) description of the rule, 4) availability of the rule, and 5) code or instructions for specifying the behavior of the rule. In one embodiment, the location is an integer starting from 0 that identifies the Merge Rule's location in the selector. In some cases, an integer value of 0 identifies the top or first entry. In some embodiments, the merge rules 260 are in the order specified in a grid of the graphical user interface. If a custom merge rule location is a negative number, then this behaves like lists in Python: −1 means the last element in the selector, −2 the second to the last, etc. In some cases, a description is a short text description of the rule. In one embodiment, this description may be displayed when the user moves the mouse over a particular selector. In some embodiments, the availability specifies when a rule can be used. The value is a text string with a value of "All", "CRM-CRM", "CSV-CRM", or "CSV-CSV". "CRM-CRM" indicates the rule is available for CRM to CRM merging, CSV-CRM for CSV format to CRM merging, and CSV-CSV for CSV format to CSV format merging. "All" availability indicates the rule is available for all merge cases. The rule may be specified by any programming language, scripting language, or other instructions. In one embodiment, the rule comprises Python source code that specifies, describes or directs how a rule behaves.

In some embodiments, the rules 260 may be pre-configured and stored in a file. For example, pre-configured rules may be provided in a MergeRules.pye file and stored in a known directory, such as the Config\MergeRules subdirectory of an application install directory. In some embodiments, a rule loader will look for .pye files for the pre-configured merge rules. If the .pye file does not exist that rule will not be loaded by the data conditioning framework 120. Custom merge rules may be stored in .py, .pyc, or .pye file in the Config\MergeRules. In some cases, more than one rule can be specified per file. Each rule in a .py file is a class that defines the rule and this class inherits from a MergeRule base class. In one embodiment, the MergeRule base class exists in the ccrmExtensions.py file.

In some embodiments, rules 260 specify how duplicate data records from data sources 240 are to be merged. In one embodiment, python dictionaries provide access to appropriate functions and variables in classes for use by the rules 260. This availability effectively specifies what type of rules can be written, or at least what type of information is available to rules. In many embodiments, functions and variables are provided via classes for the following information: 1) manual edits, 2) standardization changes (values before and after standardization), 3) CRM information including CRM user name, CRM DB name, CRM date and time format, 4) connector name, 5) entity type (Account, Contact, Lead), 6) Mode (CSV-CSV, CSV-CRM, CRM-CRM), 7) Required fields, 8) Duplicate List, 9) each record in a Duplicate, 10) the final record for each Duplicate, 11) Conflicting fields for each Duplicate, 12) Current selected conflicting field, 13) Duplicate master record number, and 14) Non-duplicate records. Also, in one embodiment, the data conditioning framework 120 provides the ability for allowing manual selections to over ride merge rules 260 so that manual selections of values will not be lost when a merge rule is applied.

In another embodiment, the data conditioning framework 120 provides the ability to specify when to run the selected rule. For example, a rule 260 may trigger by any application or data constrain framework 120 event, such as via any of the following CleanCRM application events:

onInit: When DV receives the data grid the rule 260 is run on the entire DuplicateList changeDuplicate: When user changes the status of a "Dup?" button, the rule 260 is run on the "current" duplicate.

changeMasterLocation: When user changes the status of a "Master Loc" button, the rule 260 is run on the "current" duplicate.

changeDiscard: When user changes the status of a "Discard" button, the rule 260 is run on the "current" duplicate.

changeConflictField: When user changes the status of a conflict field button, the rule 260 is run on the "current" duplicate.

editFinalField: When user changes the text of a final field, the rule 260 is run on the "current" duplicate.

In one embodiment, the data conditioning framework 120 provides the ability to allow manual edits to over ride rules. If a user manually changes a duplicate value or button, and manual override is selected, such as via a button on a graphical user interface of the CleanCRM application, then when the rule is run on the duplicate, the manual changes are not changed by the logic of the rule 260. In another embodiment, manual override may be the default behavior.

Although the rules 260 are generally described in view of Python and/or an application such as CleanCRM, the rules may be implemented or configured with any programming, scripting, textual or configuration language, and may use any events provided by the data conditioning framework or the application using the data conditioning framework 120.

In yet another embodiment, the rules 260 may include standardize rules as another plug point or extension to the data conditioning framework 120. Standardize rules 260 provide the ability to call code before, after, or before and after the standardizations are applied to data records, such as via the Standardize Screen of the CleanCRM application described in detail below. In another embodiment, rules 260 are loaded into the application or data conditioning framework 120 memory upon initialization. In yet another embodiment, the rules 260 may specify or identify match criteria 225. In one embodiment, the rules may specify or identify an index 230, such as a metric index. In still another embodiment, the rules 260 may specify or identify one or more approximate matching or searching techniques as will be discussed in conjunction with FIGS. 3-7.

Figure 2B:
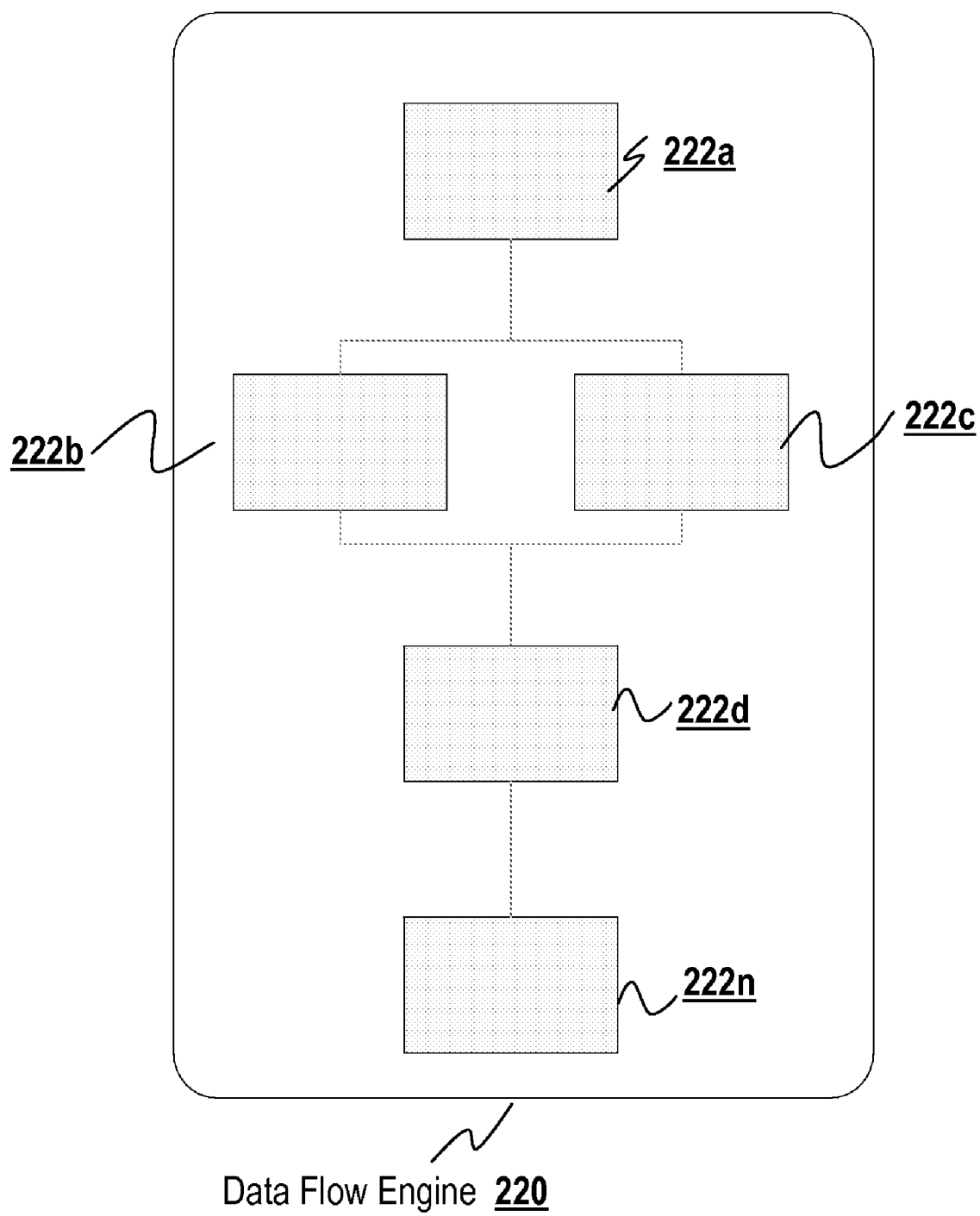
FIG. 2B is a block diagram of a data flow engine for practicing an embodiment of the data conditioning framework.

The data conditioning framework 120 includes a data flow engine 220 for processing one or more data records, such as any data from data sources 240a-240b. The data flow engine 220 may include software, hardware, or any combination of software and hardware. In one embodiment, the data flow engine 220 processes textual data, such as strings. In some embodiments, the data flow engine 220 processes data via a grid or table, referred to as a data grid, such as a table of textual data. In some cases, the data flow engine 220 receives, uses, or otherwise processes data grids. Referring now to FIG. 2B, an embodiment of the data flow engine 220 is depicted. In brief overview, the data flow engine 220 comprises a data flow graph with one or more nodes 222a-222n. Each of the nodes 222a-222n are implemented, represented, or otherwise provided by one or more modules 222a-222n, which perform computations on data in the data grid, such as parameterized computations. The modules 222a-222n are connected, interfaced or in communication such as to form a flow of data and processing of an input data grid. The data flow engine 220 may process an input data grid to provide an output data grid, one or more processes data records from the input data grid, or merging and management of the input data grid into any predetermined or desired form.

The diagrammatical view of the data flow engine 220 in FIG. 2B visually depicts an example data flow. In this example, the data flow is titled 'TestDataflow' and the modules 222a-22n are titled ReadCSV, AddColumn, NullColumn, MergeData, and PrintCSV respectively. By further way of example, the ReadCSV module 222a may read, receive or otherwise obtain a data grid for processing. In one embodiment, the ReadCSV module 222A reads in a CSV formatted file or data source 240a-b. The comma-separated values (CSV) file format is a tabular data format that has fields or values separated by the comma character. If a field's value contains a double quote character it is escaped with a pair of double quote characters. The ReadCSV module 222a may be interfaced, connected to or communication with the AddColumn module 222b and NullColumn 222c modules. Output from the ReadCSV module 222a may be communicated, received by or otherwise provided to these modules 222b-222c. The AddColumn module 222b may add one or more columns to the data grid, such as a new column to a table with one or more rows of data. The NullColumn module 222c may remove a column, or one or more portions of data in a column, and in some embodiments, set certain values in records of the column to a null value. In other embodiments, the NullColumn module 222c may set the values of records in one or more columns to a predetermined value. The predetermined value may identify a record is no longer valid, should be discarded, or in another embodiment, should be merged by the MergeData 222d module.

Output from the ReadCSV module 222a, AddColumn module 222b and NullColumn 222c module may be provided to or obtained by the MergeData 222d module. The MergeData 222d module may merge one or more data records of the data grid processed or provided as output. In some embodiments, the MergeData 222d module may perform any of the logic, functionality and operations of the approximate matching engine 210. In one embodiment, the MergeData 222d module may merge duplicate records identified via approximate matching into a single data record. In some embodiments, the data flow and the MergeData 222d module merge data records between multiple data grids, such as duplicate records from a first data source 240a found in a second data source 240b. The MergeData 222d module may provide as output to the PrintCSV 222n module one or more merged data grids. The PrintCSV 222n module may print or write the output to an output device or file, such as writing the merge data records to a data source 240b. In one embodiment, the PrintCSV 222n module prints the merged data records to a CSV file format.

The modules and data flows of the data flow engine 220 may be programmed or implemented via any type and form of programming or scripting language. In one embodiment, the data flow engine 220 is coded and implemented using Python, an open source, object oriented, scripted programming language. The output of a module 222a-222n can be interfaced, connected or in communication with any other module 222a-222n. In some embodiments, each module 222a-222n specifies or describes how many inputs the module takes. Modules 222a-222n may be programmed or implemented to take any number of inputs, including none, like the ReadCSV module illustrated in the data flow of FIG. 2B. Additionally, the modules 222a-222n may be parameterized such as to receive input or provide output via one or more parameters. For example, a file to read is a parameter of the ReadCSV 222a module. The parameters of the modules 222a-222n may be include any type and form of data representations, including any type of data declarations, such as strings, integers, arrays, data structures and objects.

Although FIG. 2B illustrates an example data flow, the data flow engine 220 may comprise any one or more data flows comprising any desired data flow with any one or more modules 222a-222n connected in a desired manner. Although the example data flow uses ReadCSV, AddColumn, NullColumn, MergeData, and PrintCSV modules, the data flow may be designed and arranged with any set of modules designed and constructed to perform any of the functions, operations and techniques described herein. For example, a module may be designed and constructed to perform any of the techniques of the data conditioning framework 120 or approximate matching engine 210 described herein, such as those technique discussed in conjunction with FIGS. 3-7. In another example, a module 222 may be designed and constructed to perform any of the functions and operations described in connection with the connectors 235, rules 260, and/or match criteria 225. In yet another example, a module 222 may be used to perform any of the functions and operations described in the example CleamCRM application discussed in FIGS. 8A-8H below.

The data flow engine 220 may comprise any type and form of interface, such as a command line, graphical or application programming interface to instantiate, start, pause, and/or stop. The data flow engine 220 can load and unload one or more data flows. In one embodiment, the data flows and modules 222a-222n are stored on a location in storage. In some embodiments, the data flow engine 220 provides information on which data flow is being processed and the stage of processing of the currently processing module. In other embodiments, the data flow engine 220 provides information related to any errors. In one embodiment, the data flow engine 220 is not tied to or implemented for any specific environment or graphical user interface functionality. In another embodiment, the data flow engine 220 can be embedded in an application, such as the CleanCRM application, which will be described in further detail below in conjunction with FIGS. 8A-8H. The data conditioning framework 120 or an application using the data conditioning framework 120 can run multiple data flow engines 120.

Figure 3:
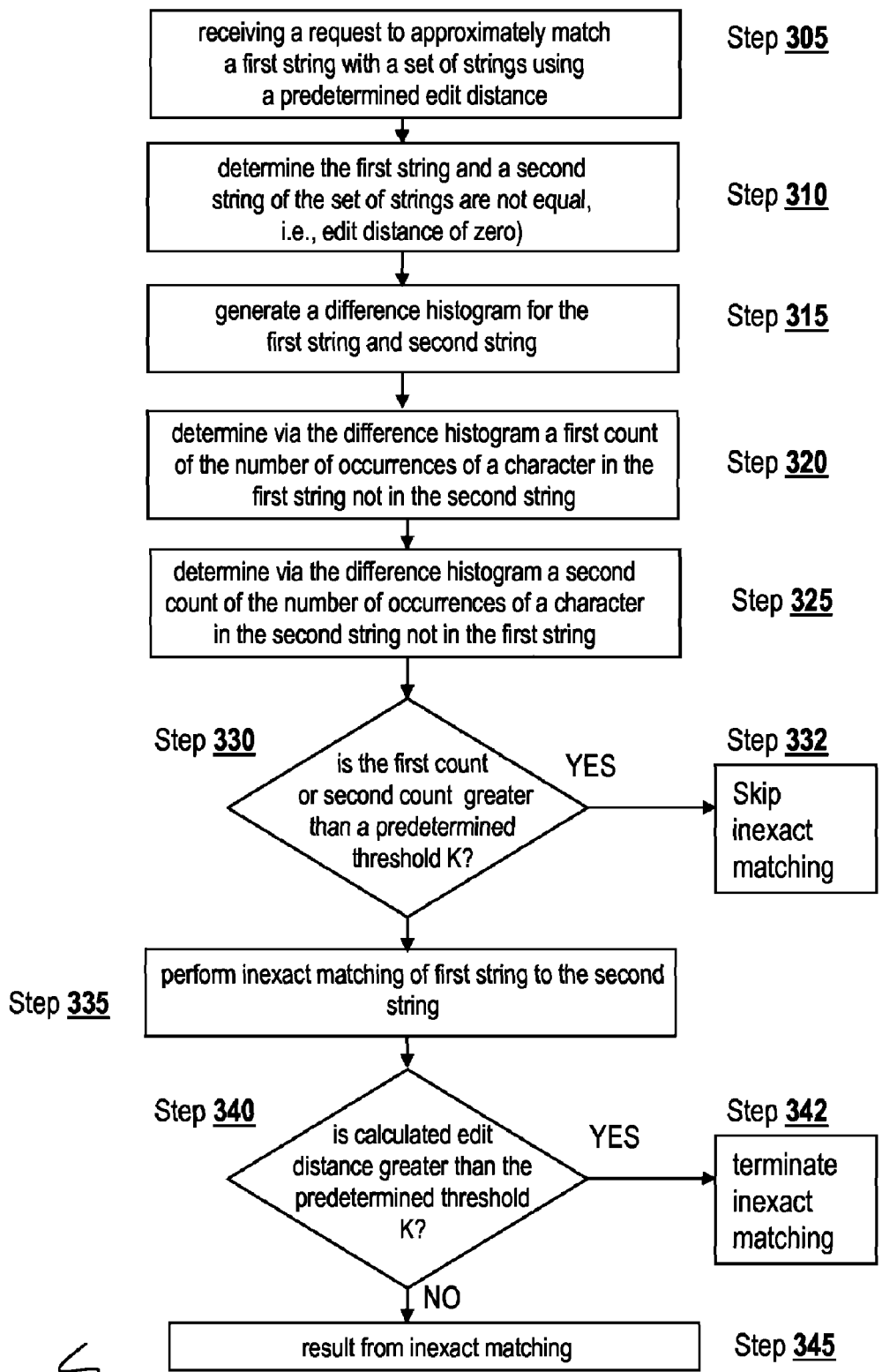
FIG. 3 is a flow diagram of steps performed in practicing a technique for trimmed inexact matching in one embodiment of the data conditioning framework.
Figure 4:
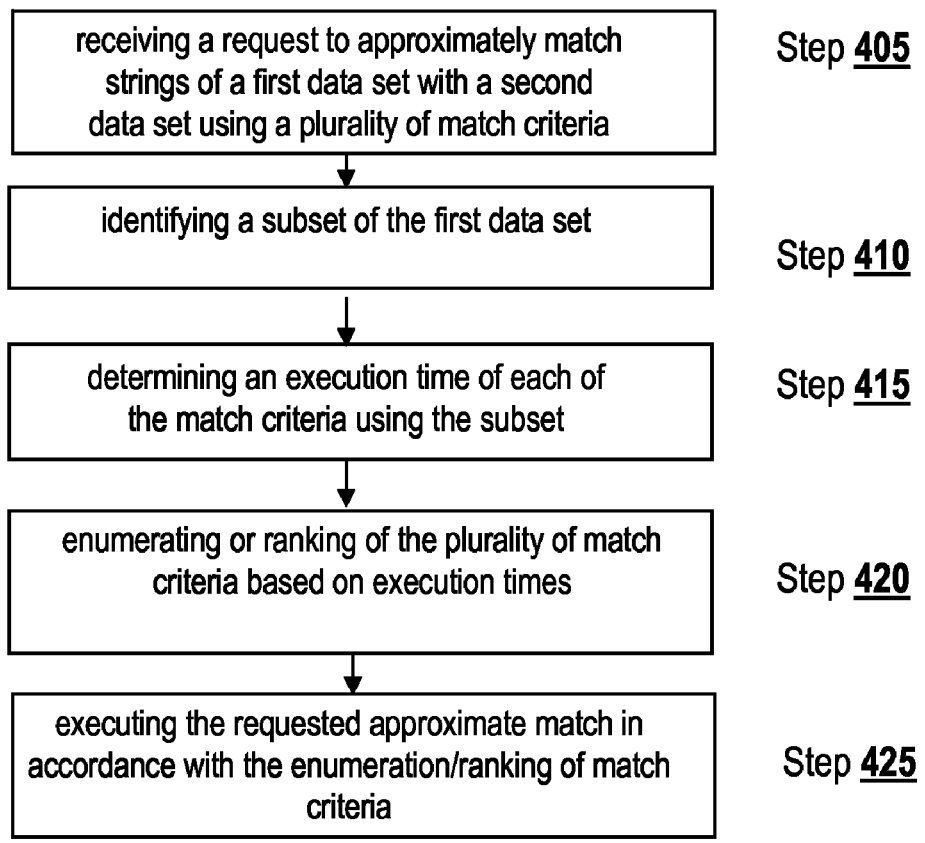
FIG. 4 is a flow diagram of steps performed in practicing a technique of adaptive search ordering of match criteria in another embodiment of the data conditioning framework.
Figure 5:
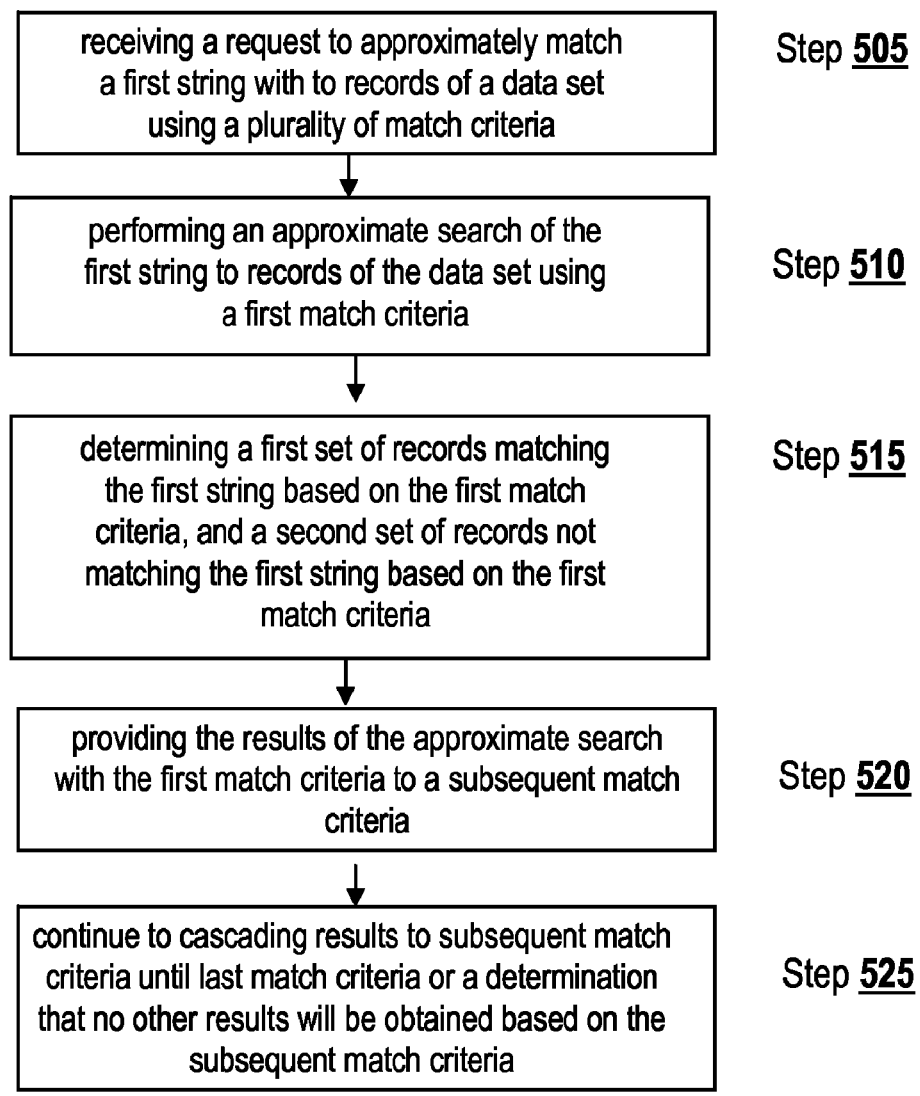
FIG. 5 is a flow diagram of steps performed in practicing a technique of cascaded search space reduction in one embodiment of the data conditioning framework.
Figure 6:
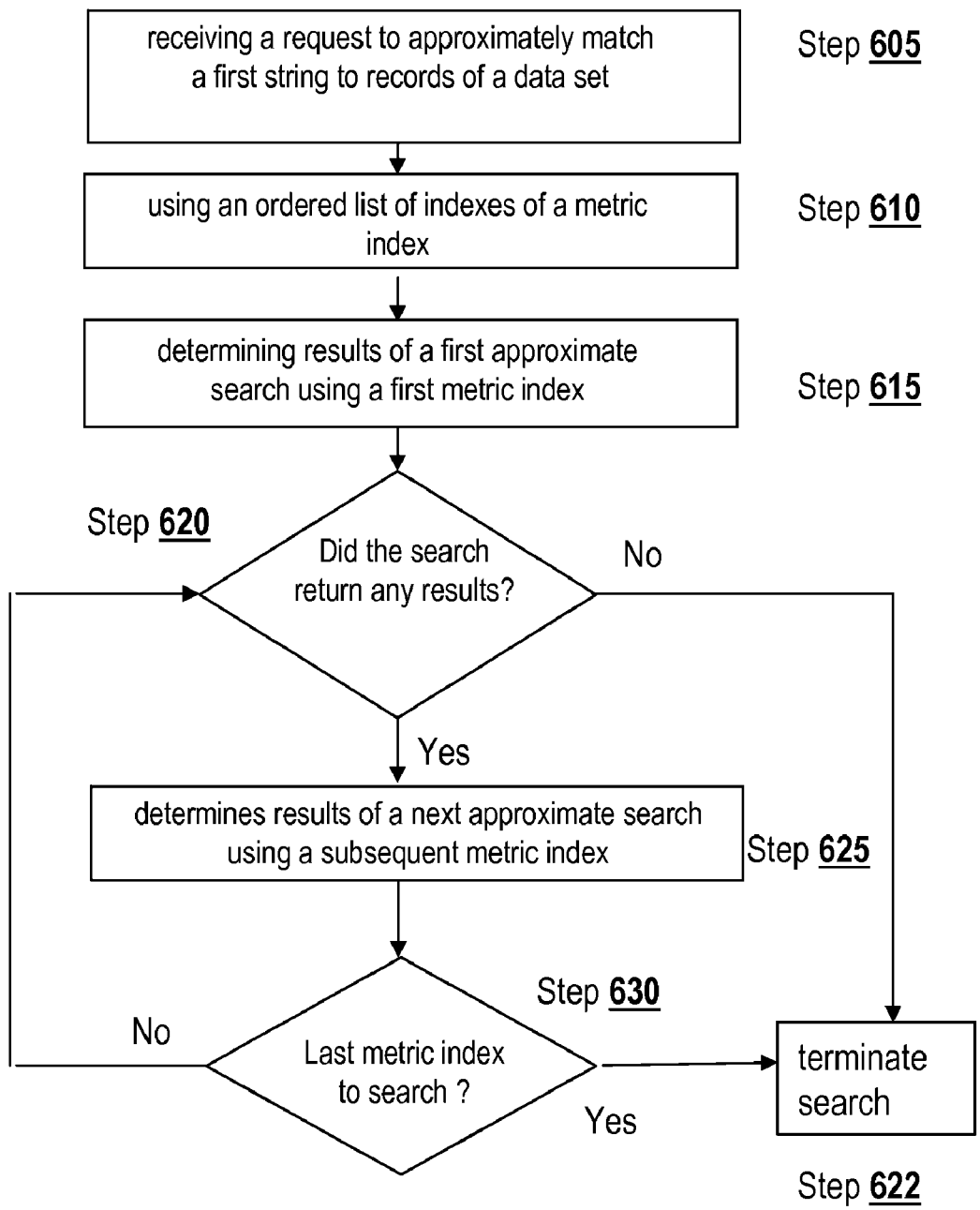
FIG. 6 is a flow diagram of steps performed in practicing a technique of tiered metric indexing in another embodiment of the data conditioning framework.
Figure 7:
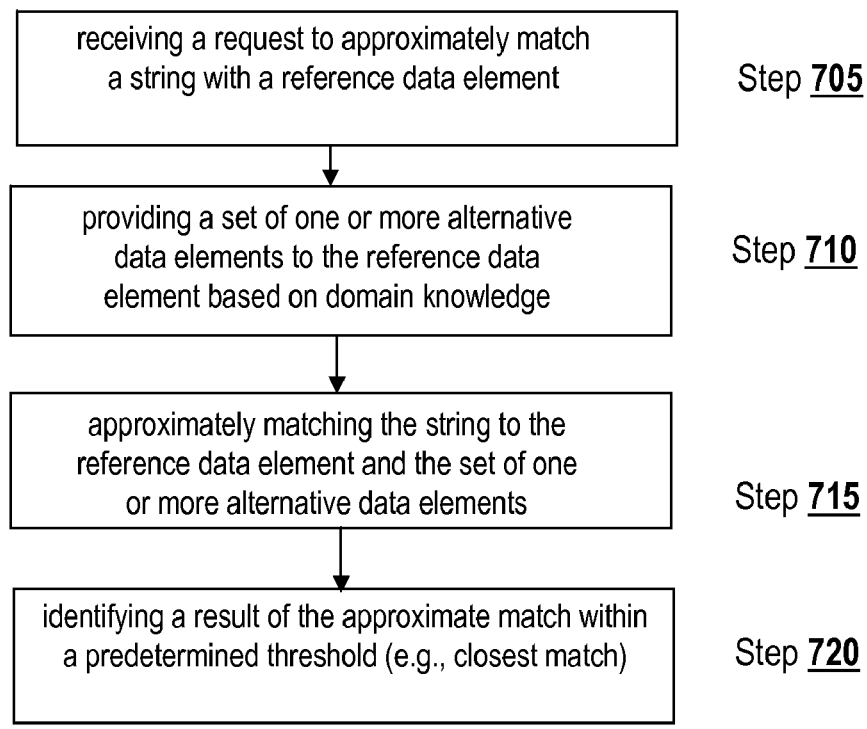
FIG. 7 is a flow diagram of steps performed in practicing a technique of domain knowledge based approximate matching in one embodiment of the data conditioning framework.

The data conditioning framework 120 and/or approximate matching engine 210 provides the following techniques to improve the efficiency and performance of approximate searching and matching of data records: 1) inexact trimmed matching, 2) adaptive search ordering, 3) cascading search space reduction, 4) tiered metric indexing, and 5) domain knowledge matching. These techniques will be described in conjunction with FIGS. 3-7. FIG. 3 illustrates an embodiment of the inexact trimmed matching technique for performing approximate matching between strings. FIG. 4 illustrates an embodiment of the adaptive search ordering technique for ordering a plurality of match criteria, and FIG. 5 illustrates an embodiment of the cascading search result technique for sharing results between a plurality of match criteria. FIG. 6 illustrates an embodiment of a metric based index technique for approximate searching, and FIG. 7 illustrates an embodiment of another technique for applying domain knowledge to approximate matching.

Referring now to FIG. 3, a method 300 of an embodiment of performing a trimmed inexact matching technique is depicted. The inexact matching technique determines if the edit distance between two strings is within a given or predetermined value, K, where K>0. In brief overview, at step 305, the data conditioning framework 120 receives a request to approximately match a first string with a set of strings using a predetermined edit distance. At step 320, the data conditioning framework 120 determines if the first string and a second string of the set of strings are not equal, e.g., have an edit distance >0. If the strings are equal, the data conditioning framework 120 may return a match without performing any of the other steps of method 300. At step 315, the data conditioning framework 120 generates a difference histogram for the first string and the second string. At step 320, the data conditioning framework 120 determines via the difference histogram a first count of the number of occurrences of a character in the first string not in the second string. At step 325, the data conditioning framework 120 determines via the difference histogram a second count of the number of occurrences of a character in the second string not in the first string. At step 330, the data conditioning framework 120 determines if the first count or second count is greater than a predetermined threshold K. If the first count or second count is greater than predetermined threshold K, then method 300 skips inexact matching of the strings at step 332. If the first count or second count is less than or equal to the predetermined threshold K, then at step 335, the method performs inexact matching of the first string to the second string. While performing the inexact matching, if at step 340, the data conditioning framework 120 determines the calculated edit distance is greater than the predetermined threshold K, and then at step 342, the inexact matching is terminated. Otherwise, at step 345, the data conditioning framework 120 provides a result of performing inexact matching between the first string and the second string.

In further detail, at step 305, the data conditioning framework 120 receives a request to approximately match, e.g., an approximate match request, by any suitable means and/or mechanisms. In one embodiment, the data conditioning framework 120 receives an approximate match request from a command line or graphical user interface. In another embodiment, the data conditioning framework 120 receives an approximate match request from an application programming interface (API). In some embodiments, the data conditioning framework 120 receives an approximate match request via a message, network communication or inter-process communication interface. In one embodiment, the data conditioning framework 120 receives an approximate match request via a web-based request, XML message, or a web-service interface.

In some embodiments, the data conditioning framework 120 receives a request to approximately match one or more records from a first data source 240a to one or more records of a second data source 240n. In one embodiment, the approximate match request may identify the strings to be approximately matched. In another embodiment, the approximate match request may identify the data sources 240a-240b, or portions thereof, such as tables, etc., to be approximately matched. In yet another embodiment, the approximate match request identifies the predetermined threshold K in the request or as part of the request. In other embodiments, the predetermined threshold K is configured in the data conditioning framework 120 or is read from a configuration file by the data conditioning framework 120. In some embodiments, the predetermined threshold K is selected, identified or provided by a user via a graphical user interface of the data conditioning framework 120 or an application using the data conditioning framework 120.

At step 310, the data conditioning framework 120 determines the first string and one of the strings, such as a second string, of the set of strings are the same. In some embodiments, the data conditioning framework 120 uses any type and form of string comparison functions of the underlying programming or scripting language to determine if the first string and the second string are the same. In other embodiments, the data conditioning framework 120 may perform any set of executable instructions to perform a string or character comparison to determine if the strings are the same. If the strings are the same, then they exactly match and the edit distance is zero. In some embodiments, if the strings are determined to be the same, the data conditioning framework 120 does not perform approximate matching of the strings, such as by skipping approximate matching at step 332.

At step 315, the data conditioning framework 120 generates, creates, forms or otherwise provides a difference histogram of the characters in the first string and the second string. By using a difference histogram, the data conditioning framework 120 can perform filtering to determine if the edit distance between two strings, such as the first string and the second string, is greater than the predetermined threshold K. In one embodiment, if the difference histogram has a value that is greater than predetermined threshold K, then the strings are not considered approximately similar within the threshold, and the data conditioning framework 120 can skip performing, or otherwise not perform the approximate matching of the first string to the second string.

In some embodiments, a histogram depicts graphically, textually, or otherwise, a number of occurrences of each value in a data set. In one embodiment, the histogram depicts graphically, textually, or otherwise a frequency of distribution of values in the data set. In view of the inexact matching technique of method 300, a difference histogram represents graphically, textually, or otherwise, a difference in the number of occurrences of each character in the first string and the second string. In some embodiments, the difference histogram represents graphically, textually, or otherwise, a difference in the frequency distribution of each character in the first string and the second string. The data conditioning framework 120 may provide the difference histogram via one or more data structures, arrays, objects and application programming interfaces. In some embodiments, the data conditioning framework 120 comprises a set of executable instructions in any programming or scripting language to create the different histogram. In one embodiment, the data conditioning framework 120 provides the difference histogram via any type and form of statistical application, program, library, or tool.

By way of an example, generating a difference histogram H will be described. The difference histogram may be represented by the data structure or array H. For purposes the example, N will be assumed to be the number of characters in the alphabet B, which represents expected strings. In some embodiments, alphabet B may be the characters used in the set of strings. In other embodiments, alphabet B may be the characters used in the first string and the second string. In still another embodiment, alphabet B may be the characters used in a first data source 240a, and/or a second data source 240b. Each value of the alphabet may be identified by the letter A, which is represented as an integer value from 0 to N−1. The difference histogram H is created as an array H with H[N] cells or elements. S1 will represent the first string and S2 the second string. The different histogram H is populated or assigned values as follows:

For i in len(S1), H[S1[i]]+=1; and
For i in len(S2), H[S2[i]]−=1.

For each character in the first string, the corresponding cell of the H array is incremented by a positive value, e.g., 1. For each character in the second string, the corresponding cell of the H array is decrement by a negative value, e.g., −1. Upon population of the H array, the difference histogram specifies or describes a difference in frequency distribution or occurrence of characters between the first string and the second string.

At steps 320 and 325, a first count and a second count are determined via the difference histogram. In one embodiment, the first count identifies the number of occurrences of a character in the second string not in the first string, and the second count identifies the number of occurrences of a character in the first string not in the second string.

By way of example, determination or computing of the first and second count via counters will be described. Two counters Cp and Cn are initialized to an initial value, such as zero. For every character A in alphabet B, if H[A]>0 then increment Cp by H[A]. Otherwise, if H[A]<0 then decrement Cn by H[A]. Based on the values of the counters Cp and Cn in comparison to the predetermined threshold K, the data conditioning framework 120 can skip performing inexact matching of the strings.

At step 330, in one embodiment, if the first count, Cp, is greater than the predetermined threshold K, the data conditioning framework 120 may terminate the method 300 at step 322 by skipping or not performing inexact matching of the strings. With the first count greater than the predetermined threshold K, the difference or edit distance between the first string and the second strings is guaranteed to be greater than K. Likewise, if the second count is now less than the negative of the predetermined threshold, -K, the difference or edit distance between the first string and the second strings is guaranteed to be greater than K. As such, the data conditioning framework 120, at step 330, can determine to skip performing inexact matching at step 332. In some embodiments, to improve performance, method 300 may also keep track of which letters A in alphabet B exist in the first string and the second string. In one embodiment, the data conditioning framework 120 will use or access the elements or cells of the different histogram H[A] if A is a character in the first string or the second string.

At step 335, if the first count or second count does not identify an edit distance between the first string and the second string greater than the predetermined threshold K, the data conditioning framework 120 performs inexact matching between the strings. In one embodiment, the approximate matching engine 210 performs inexact matching between the first string and the second string. In some embodiments, the approximate matching engine 210 uses an adaptation or implementation of the Levenshtein edit or distance calculation. In another embodiment, the approximate matching engine 210 calculates the edit distance between the strings with an optimization using the predetermined threshold K. In some embodiments, while performing the approximate matching, if at step 340, the approximate matching engine 210 determines the edit distance reaches or exceeds the predetermined threshold K, the approximate matching engine 210 may terminate the inexact matching at step 342. Otherwise, at step 345, the approximate matching engine 210 returns or provides a result of the approximate matching of the strings. In one embodiment, the approximate matching engine 210 indicates that the strings either approximately match or do not approximately match. In another embodiment, the approximate matching engine 210 identifies a difference or how much the strings do not approximately match by providing a calculated edit distance or a % difference value.

Using the fast filtering of the difference histogram, the data conditioning framework 120 and/or approximate matching engine 210 perform approximate match computation or processing on the strings that are filtered to have an edit distance less than or equal to the predetermined threshold K. The predetermined threshold K may be set or configured to any desired value or sensitivity. In some embodiments, the predetermined threshold may be equal to the predetermined edit distance between strings that will be considered an approximate match. In other embodiments, the predetermined threshold may be set to a value smaller than the predetermined or desired edit distance to be considered a match. For example, the predetermined threshold may be set to a percentage of the desired edit distance or the length of characters of the first string or second string. In yet another embodiment, the predetermined threshold may be set to a value greater than the desired edit distance, and below a higher threshold or maximum edit distance between the strings.

Referring now to FIG. 4, a method 400 of an embodiment of the adaptive search ordering technique of the data conditioning framework 120 for ordering a plurality of match criteria is illustrated. In this embodiment, the data conditioning framework 120 performs an approximate search using a subset of the data to be matched and the match criteria 225 identified for the approximate search. The match criteria 225 are then ordered or ranked based on the time to perform the approximate search using the subset of data. In one embodiment, the match criteria 225 are ordered from the fastest executing match criteria 225, e.g., first match criteria, to the slowest match criteria, e.g., the last match criteria.

In brief overview of method 400, at step 405, the data conditioning framework 120 receives a request to approximately match strings of a first data set with a second data set using a plurality of match criteria 225. At step 410, the data conditioning framework 120 identifies a subset of the first data set. At step 415, the data conditioning framework 120 determines an execution time for each of the match criteria 225 using the subset of the first data set. At step 420, the data conditioning framework 120 enumerates, ranks or orders the plurality of the match criteria 225 based on their respective execution times. At step 425, the data conditioning framework 120 executes the requested approximate match in accordance with the order or ranking of the match criteria 225.

In further detail, at step 405, the data conditioning framework 120 receives a request to approximately match, e.g., an approximate match request, by any suitable means and/or mechanisms. For example, the data conditioning framework 120 may receive a request as described above in connection with step 305 of method 300. In other embodiments, the data conditioning framework 120 receives a request to approximately search for any of the strings in the first data set 240a for one or more approximate matches with strings in a second data set 240b. In another embodiment, the data conditioning framework 120 receives a request to order or rank match criteria based on first and second data sets 240a-240b. The first and second data sets 240a-240b may be a sample or example of type of data to be processed using the match criteria 225.

At step 410, the data conditioning framework 120 identifies a subset or portion of the first data set 240a. In one embodiment, the subset of the first data set 240a is used to determine execution times of performing an approximate match with the match criteria 225 against a second data set 240b. In some embodiments, a subset of the first data set 240a is used to prevent from executing a substantial or entire portion of the approximate search to determine the execution times of the match criteria 225.

In another embodiment, the data conditioning framework 120 also identifies a subset or portion of the second data set 240b. As such, in one embodiment, the data conditioning framework 120 may determine execution times of match criteria 225 using a subset of the first data set 240*a* and a subset of the second data set 240*b*.

The data conditioning framework 120 may identify a subset of the first data set 240*a* and/or second data set 240*b* by any suitable means and/or mechanisms. In one embodiment, the data conditioning framework 120 identifies the first set of records in sequence of the data set 240. For example, the data conditioning framework 120 may identify the first 5, 10, 15, 20, 25, 50, 75, or 100 rows or records of the data set 240. In another embodiment, data conditioning framework 120 identifies every other record, or every third record, or every fourth record, etc. of the data set 240. In yet another embodiment, the data conditioning framework 120 may identify some last rows or records of the data set 240, such as the last 5, 10, 15, 20, 25, 50, 75, or 100 rows or records. In some embodiments, the data conditioning framework 120 may identify a subsequent set of rows or records from near the middle of the data set 240. In other embodiments, the data conditioning framework 120 may identify a first portion, a middle portion, and/or an ending portion of rows or records of the data set 240, subsequent, in a certain frequency or pattern, or otherwise. In one embodiment, the data conditioning framework 120 may identify rows or records of the data set 240 by size. In another embodiment, the data conditioning framework 120 may identify rows or records of the data set 240 by type or category. In some embodiments, the data conditioning framework 120 uses one or more rules 260 to identify a subset of the data set 240. In other embodiments, the data conditioning framework 120 uses domain knowledge to identify a subset of the data set 240. For example, in one embodiment, a user may identify a subset of the data set 240*a*-240*b*

At step 415, the data conditioning framework 120 determines an execution time for the match criteria 225 using the identified subset of data from step 410. In one embodiment, the data conditioning framework 120 determines an execution time for each of the match criteria 225 by performing an approximate match of strings in the identified subset of data of the first data set 240*a* with the records of the second data set 240*b* using the match criteria 225. For example, in one case, the data conditioning framework 120 runs an approximate search of a first string of the identified subset of data in the records of the second data set 240*b* using a first match criteria 225. In one embodiment, the data conditioning framework 120 performs one approximate search for each match criteria 225 based on one string from the identified subset of data. In other embodiments, the data conditioning framework 120 performs a plurality of approximate searches for each match criteria 255 based on one string from the identified subset of data. In yet another embodiment, the data conditioning framework 120 performs a plurality of approximate searches for each match criteria 225 based on a plurality of strings from the identified subset of data.

In some embodiments, the data conditioning framework 120 records execution information for each match criteria 225 to memory or storage, and associates this information with the match criteria 225. In one embodiment, the execution information may include start time(s), end time(s) and/or total execution time(s). For example, in another embodiment, the data conditioning framework 120 uses a data structure or array to track the execution times of each of the match criteria 225. In other embodiments, the data conditioning framework 120 records the execution information or execution time as an average or a median of execution times for a match criteria over a plurality of approximate searches using the match criteria. In some embodiments, the execution time comprises the execution time of one approximate search using the match criteria 225, either with a single string or a plurality of strings.

In another embodiment, the execution time may include the highest or best execution time for the match criteria 225. In yet other embodiments, the execution time may include the lowest execution time of the match criteria 225. In further embodiments, one or more execution times between the highest and lowest execution times may be used.

In one embodiment, the data conditioning framework 120 may use a lookup table, database or other structured stored information mechanism to determine execution times of a match criteria 225. For example, the data conditioning framework 120 may use a name or id of the match criteria 225 to lookup a corresponding execution time for the match criteria in a table. In some embodiments, the lookup table may comprise an average or other statistical based execution time for a match criteria 225. For example, an average or median execution time for the match criteria 225 may be used based on a history of execution times of the match criteria 225 in previous approximate searches. In some cases, the data conditioning framework 120 may use the highest or lowest execution time from the history of execution times for the match criteria.

In the case of multiple match criteria, in one embodiment, the data conditioning framework 120 may determine the execution times for the multiple match criteria by executing the multiple match criteria and recording the execution information. In another embodiment, the data conditioning framework 120 may determine the execution times for a multiple match criteria by determining the execution information for each of the component match criteria. For example, a multiple match criteria may include a first match criteria and a second match criteria. The data conditioning framework 120 may determine a first execution time for the first match criteria, and a second execution time for the second match criteria. The first and second execution times may be added or averaged to determine an execution time for the multiple match criteria. In one embodiment, the data conditioning framework 120 stores the first and second execution times of the first and second match criteria to be used by other multiple match criteria which may also have the first and/or second match criteria.

At step 420, the data conditioning framework 120 enumerates, orders, or otherwise ranks the match criteria 225 based on determined execution times from step 415. In one embodiment, the data conditioning framework 120 orders or ranks the match criteria 225 from highest execution time to lowest execution time. In another embodiment, the data conditioning framework 120 orders or ranks the match criteria 225 from lowest execution time to highest execution time. In some embodiments, the data conditioning framework 120 orders the match criteria 225 in memory or storage. For example, the data conditioning framework 120 may rearrange a list of match criteria into an order based on the execution times. In other embodiments, the data conditioning framework 120 orders or ranks the match criteria 225 by assigning a ranking or order identifier to the match criteria. For example, in some cases, the data conditioning framework 120 may assign a ranking number to a value of the data structure or object representing the match criteria 225. In another case, the data conditioning framework 120 may store in, or in association with, the match criteria 225 a ranking or order identifier, e.g. a ranking number, such as via a field or column of a table in a database. In yet another embodiment, the data conditioning framework 120 may generate an enumerated list of match criteria 225 based on the order or ranking in accordance with the execution times. In some cases, this enumerated list of match criteria 225 may be stored in memory or storage.

At step 425, the data conditioning framework 120 and/or approximate matching engine 210 performs the approximate match in accordance with the ranking or order of the match criteria 225. In one embodiment, in response to the request of step 405, the data conditioning framework 120 performs an approximate search between the first data set 240a and the second data set 240b using each of the match criteria 225 in the order specified in accordance with step 420. As such, in some embodiments, the data conditioning framework 120 may perform the faster match criteria searches first followed by the slower match criteria searches. In other embodiments, the data conditioning framework 120 may perform the slower match criteria searches first followed by faster match criteria searches. In yet other embodiments, the data conditioning framework 120 may distribute the slower match criteria searches to a second instance of the data conditioning framework 120', or portion thereof, or in another case, a second computing device 100' for executing the match criteria search. In one case, the data conditioning framework 120 may initiate a second process, service or thread to handle the slower match criteria. For example, in one embodiment, a first instance of the data conditioning framework 120 may execute the faster match criteria from a top of the ranking or the order, and a second instance of the data conditioning framework 120 may execute the slower match criteria from the bottom of the ranking.

In some embodiments, the data conditioning framework 120 does not perform steps 410, 415 and 420 in response to request 405. For example, the data conditioning framework 120 may have already ordered the same match criteria 225 from a previous request. As such, in one embodiment, at step 405, the data conditioning framework 120 determines the match criteria 224 have been ordered or ranked for the approximate search and then performs step 425 using the previously ordered list of match criteria 225. In yet another embodiment, the data conditioning framework 120 may receive a first request to order or rank match criteria 225 based on data sets 240a-240b without performing the approximate search. Then, the data conditioning framework 120 may receive a second request to perform an approximate search on the data sets 240a-240b using the ordering of match criteria from the first request. For example, the first request may be used to train the data conditioning framework 120 with some sample data sets to order the match criteria 225. In response to the second request, the data conditioning framework 120 may perform an approximate search on a second data set based on the training.

Referring now to FIG. 5, a method 500 of an embodiment of the cascaded search space reduction technique of the data conditioning framework 120 is illustrated. In this embodiment, the data conditioning framework 120 cascades the results of a first match criteria to a subsequent match criteria. In one case, since the results of each portion of a match criteria 225 is to be logically ANDed with the next portion of the match criteria 225, then the records that do match the first portion need be matched using the second portion of the match criteria. Hence, the number of records searched in the second portion of the match criteria is less than or equal to the number of records searched in the first portion of match criteria. In another case of multiple match criteria, since the results of each match criteria of a multiple match criteria 225 is to be logically ORed with the next match criteria, then only the records that do not match the first match criteria needs to be matched using the next match criteria. In some embodiments, this technique has the effect of rapidly reducing the number of searches that each following match criteria has to perform. In some embodiments, if the match criteria are ordered from faster to slower, for example, in accordance with method 400, the slower match criteria 225 will be searching on a reduced subset of the data, with the subset of data shrinking from match criteria to match criteria.

In brief overview of method 500, at step 505, the data conditioning framework 120 receives a request to approximately match a first string with records of a data set using a plurality of match criteria. At step 510, the data conditioning framework 120 performs an approximate match of the first string to records of the data set using a first match criteria. At step 515, the data conditioning framework 120 determines a first set of records matching the first string based on the first match criteria 225, or portion thereof, and a second set of records not matching the first string based on the first match criteria 225, or portion thereof. At step 520, the data conditioning framework 120 provides the results of the approximate search with the first match criteria, to a second portion of the match criteria or to a subsequent match criteria 225. At step 525, the data conditioning framework 120 continues to cascade results to subsequent match criteria, and portions thereof, until a determination that no other results will be obtained based on the remaining match criteria or completion or termination of the approximate search.

In further detail, at step 505, the data conditioning framework 120 receives a request to approximately match, e.g., an approximate match request, by any suitable means and/or mechanisms. For example, the data conditioning framework 120 may receive a request as described above in connection with step 305 of method 300, or as in step 405 of method 400. In one embodiment, the data conditioning framework 120 receives a request to perform an approximate search of records or strings of the first data source 240a in the second data source 240b using a plurality of match criteria 225. In one embodiment, the plurality of match criteria 225 may comprises single match criteria having logically ANDed fields and thresholds. In another embodiment, the plurality of match criteria 225 may include one or more multiple match criteria having logically ORed match criteria 225.

At step 510, the data conditioning framework 120 and/or approximate matching engine 210 performs an approximate search of a first string of a first data source 240a to one or more records of a second data source 240b using a first match criteria 225. In one embodiment, the data conditioning framework 120 performs an approximate search using a first portion of the first match criteria 225 such as a first field and a first threshold, and/or a second portion of the first match criteria 225, such as a second field and a second threshold. In another embodiment, the data conditioning framework 120 performs an approximate search using a first match criteria and/or a second match criteria of a multiple match criteria 225.

At step 515, the data conditioning framework 120 and/or approximate matching engine 210 determines results of the approximate search performed at step 510. In one embodiment, the data conditioning framework 120 determines a first set or portion of the second data source 240b, e.g., records, not matching one or more records or strings of the first data source 240a. In another embodiment, the data conditioning framework 120 determines a first or portion of the second data source 240b matching one or more records or strings of the first data source 240a. In some embodiments, the data conditioning framework 120 determines a result of a first portion of a match criteria 225, such as those records of the second data source 240b matching or not matching a first field and first threshold. In other embodiments, the data conditioning framework 120 determines a result of a first match criteria of a multiple match criteria 225, such as those records of the second data source 240b matching or not matching the first match criteria.

At step 520, based on the results of the approximate search of each match criteria 225, the data conditioning framework 120 and/or approximate matching engine 210 may provide or not provide the results to a subsequent portion of a match criteria or multiple match criteria. In some embodiments, the data conditioning framework 120 cascades or passes the results to a subsequent portion of the match criteria or multiple match criteria. In one embodiment, the data conditioning framework 120 provides the records of the second data source 240b matching the first portion of the match criteria, e.g., first field and first threshold, to the second portion of the match criteria, e.g., second field and second threshold. As such, in this embodiment, the approximate matching engine 210 performs an approximate search on the records of the second data source 240b matching the first portion of the match criteria 225, and does not further process the records of the second data source 240b not matching the first portion of the match criteria 225. In another embodiment, the data conditioning framework 120 provides the records of the second data source 240b not matching the first match criteria of a multiple match criteria 225 to a second match criteria of the multiple match criteria 225. In this embodiment, the approximate matching engine 210 performs an approximate search of the records of the second data source 240b not matching the first match criteria, and does not further process the records of the second data source 240b matching the first match criteria.

Any subsequent portion of a match criteria, multiple or otherwise, may receive a reduced portion of the records of the second data source 240b to search or perform approximate matching. At step 525, the data conditioning framework 120 and/or approximate matching engine 210 continues to perform steps 510, 515, and 520 for subsequent match criteria of the plurality of match criteria 225 being used for the approximate search. For each approximate search on a portion of match criteria, the results of records either matched or not matched are cascaded, propagated, passed, or otherwise provided to a next or subsequent match criteria, or portion thereof. In some embodiments, the cascading of results continues until an approximate search of the last match criteria is performed or otherwise the approximate search requested at step 505 is completed or terminated. In other embodiments, the cascading of results continues until the set of records to search in accordance with remaining match criteria have been reduced to a zero, empty or null set. For example, the data conditioning framework 120 may determine to not perform any remaining match criteria as there are no results to cascade to those match criteria. In another example, the data conditioning framework 120 may determine that performing an approximate search using any remaining match criteria with the reduced data set will return no results.

In some embodiments, the steps of method 500 are performed with an ordered or ranked list of match criteria 225. In one embodiment, the match criteria 225 are ordered in accordance with the techniques of method 400 discussed above. For example, the plurality of match criteria 225 may be ordered by execution times from fastest to slowest. As such, in this example, the slower match criteria will receive a reduced set of data to process from the cascaded results. The faster match criteria will be used for the larger portions of the data set while the slower match criteria will be used for the smaller portions of the data set. Thus, in some embodiments, using the ranked list of match criteria with propagation of results further increases the efficiency and performance of the approximate search.

Referring now to FIG. 6, a method 600 of an embodiment of the tiered and metric indexing techniques of the data conditioning framework 120 is illustrated. In this embodiment, the data conditioning framework 120 uses one or more metric indexes 230 to perform approximate search. The metric index may include a size-based metric, such as string lengths, or a first and last character metric index, such as the first and last characters of strings in a data source 240. The data conditioning framework 120 may also tier the metric indexes or have the metric indexes in an order to be searched. As such, in one embodiment, if a first metric index of a plurality of ordered metric indexes 230 does not return a result, then a subsequent or second metric index will not be searched and the approximate searching terminates. The data conditioning framework 120 may deploy metric indexes, tiered, ordered or otherwise to improve the efficient and performance of approximate searching.

In brief overview of method 600, at step 605, the data conditioning framework 120 receives a request to approximately match a first string to records of a data set 240. At step 610, the data conditioning framework 120 identifies an ordered list of metric indexes to use for the approximate search. At step 615, the data conditioning framework 120 determines results of an approximate search using a first metric index. At step 620, the data conditioning framework 120 determines if the search produced any matching results. If no matches resulted from the search, the data conditioning framework 120 terminates the search at step 622. Otherwise, at step 625, the data conditioning framework 120 determines the results of a next approximate search using a subsequent metric index of the ordered list of metric indexes. At step 630, If the next metric index is the last metric index, the data conditioning framework 120 obtains the results and completes the search at step 622. Otherwise, the data conditioning framework 120 continues at step 620 to determine results from subsequent metric index searches until the last metric index or termination or completion of the approximate search.

In further detail, at step 605, the data conditioning framework 120 receives a request to approximately match, e.g., an approximate match request, by any suitable means and/or mechanisms. For example, the data conditioning framework 120 may receive a request as described above in connection with step 305 of method 300, step 405 of method 400, or as in step 505 of method 500. In one embodiment, the data conditioning framework 120 receives a request to perform an approximate search of records or strings of the first data source 240a in the second data source 240b. In some embodiments, the request may include using one or more match criteria 225. In other embodiments, the request may identify one or more metric indexes 230, 230' to use for the approximate search.

At step 610, the data conditioning framework 120 identifies or uses a metric index 230 for an approximate search. In one embodiment, the metric index 230 to use may be identified via one or more rules 260. In some embodiments, the metric index 230 may be identified via the data source 240. For example, the data source 240 may include one or more metric indexes 230, 230' as illustrated in FIG. 2A. In yet another embodiment, the data conditioning framework 120 may generated any one or more of the metric indexes 230, 230' based on an identified data source 240. In another embodiment, the metric index 230 may be ordered in a tiered manner. For example, a metric index based on a size may be tiered either from larger to smaller indexes, or smaller to larger indexes. In the example case of a sized-based metric index 230, the first metric index may be for a string length of 1, the next and second index may be for a string length of 2, etc. In the example case of a first and last character based index, the first and last character indexes may be ordered alphabetically. In yet another embodiment, the indexes 230, either sized-based or character-based, may be ordered by the number of strings or records of the data source 240 matching each index.

At step 615, the data conditioning framework 120 and/or approximate matching engine 210 performs an approximate search using the metric index 230 and determines a result from the search. In one embodiment, the approximate search or match may return a result of one or more matching records. For example, a search of a string of a 5 character length from a first data source 240*a* may be approximately matched to one or more strings of 5 character lengths from a second data source 240*b* using a sized-based metric index. In another example, a search of a string beginning with letter A and ending with letter E from a first data source 240*a* may be approximately matched to one or more strings starting with A and ending in E from the second data source 240*b* using the first and last character based metric index.

In yet another embodiment, the data conditioning framework 120 searches those sized-based metric indexes 230 within a range of lengths of a string of the first data source 240*a*. For example, a string may be searched via the sized-based metric indexes 230 having a 20% size difference to the length of the string. To identify if string S is in the sIndex with allowing tip to 20% difference in the strings characters, then compute the number characters that can be subtracted or added to S and still be within 20%. This gives a range of lengths referred to as RL. The data conditioning framework 120 searches those metric index entries where the key is in RL. For example, if the string to be searched for is 10 characters in length, the sized-based metric indexes corresponding to the range of lengths between 8 and 12 characters may be used for the approximate search.

In another embodiment, the approximate search or match may not return a matching result. Further to example of the sized-based metric index, the second data source 240*b* may not have any strings approximately matching the 5 character length string of the first data source 240*a*. In the example of the first and last character based index, the second data source 240*b* may not have any strings or strings that approximately match the string from the first data source 240*a* beginning with A and ending with E. In yet another embodiment, the approximate search may result in a string not matching because the match is below the threshold of a match criteria 225. For example, the approximate search may search those strings of 5 characters in length based on the sized-based metric index but none of those strings satisfy the predetermined threshold condition of the match criteria 225.

At step 620, the data conditioning framework 120 determines if the approximate search using the metric index, with or without match criteria 225, returns any results. In the case of a sized-based metric index, if no results are returned then the approximate search terminates at step 622. For example, if the first string of the first data source 240*a* is 5 characters in length and the metric index of 5 character length strings of the second data source 240*b* returns no matches, then the data conditioning framework 120 determines not to search any string lengths of greater than 5 characters in length from the second data source 240*b*. In the example case of a first and last character based index, the data conditioning framework 120 determines if a string exists in both the first character index and the last character index; otherwise no matching results are returned.

If the data conditioning framework 120 determines the metric index based search returned results, the data conditioning framework 120 and/or approximate match engine 210 performs another approximate search using a next index of the metric-based index 230. For example, in one embodiment, if the sized-based metric index of character length 8 returns a result, the sized-based metric index of character length 9 may be searched next. Then, at step 630, the data conditioning framework 120 continues obtaining results from subsequent metric-indexes until determining the last metric index has been searched and completes the search at step 622, or otherwise a search returns no results and terminates the search at step 622.

Although method 600 is generally discussed as using a sized-based metric index or a first and last character based metric index, the data conditioning framework 120 may use both types of metric indexes in conjunction with each other. For example, a first string of character length 5 and beginning with A and ending in E may be searched via both types of metric indexes of a second data source 240*b*. In this example, in order to return a result, the string must be found in the sized-based index corresponding to 5 characters length and the character-based indexes corresponding to a first character of A and a last character of E. Furthermore, as previously mentioned, one or more types of metric indexes may be used in conjunction with any match criteria in performing an approximate search. For example, in one embodiment, not only does an approximately matched string need to be found in the appropriate metric index but the approximately matched string may also need to be approximately matched in accordance with one or more match criteria 225.

Referring now to FIG. 7, a method 700 of an embodiment of inexact domain knowledge based searching techniques of the data conditioning framework 120 is illustrated. In this embodiment, the data conditioning framework 120 deploys inexact domain knowledge to improve the ability to match domain knowledge with a data element. In one embodiment, domain knowledge matching comprises the operations of providing a domain knowledge lookup table for a data element and then performing inexact matching on the lookup table entries to determine an approximate match. For example, the following domain knowledge lookup table 275 comprises three states of the United States:

AL, Alabama, bama
AR, Arkansas
MA, Massachusetts, mass

In this example, the two letter state designator of AL, AK, and MA are the reference values or data elements, and the other values are different or alternative ways to represent the data elements, e.g., alternative data elements, AL, AK, and MA, respectively. The domain knowledge inexact matching technique performs approximate matching of any reference data element by also performing approximate matching on the alternative ways in which the data element can be represented. Using this technique, in one embodiment, the data conditioning framework 120 selects as a result of an approximate match one of the reference data element or alternative data elements having the best or closest approximate match to the searched string, given that it is within the desired match threshold, e.g. match criteria.

In brief overview of method 700, at step 705, the data conditioning framework 120 receives a request to approximately match a string with a data element, referred to as the reference data element. At step 710, the data conditioning framework 120 provides or identifies a set of one or more alternative data elements to the reference data element, such as a domain knowledge based lookup table 275. At step 715, the data conditioning framework 120 approximately matches the string to the reference data element and the set of one or more alternative data elements. At step 720, the data conditioning framework 120 identifies one of the reference data element and the alternative data elements as a result for the approximate match within a predetermined threshold. For example, at step 720, the data conditioning framework 120 may provide as result one of the reference data element or the alternative data elements providing the closest or best approximate match.

In further detail, at step 705, the data conditioning framework 120 receives a request to approximately match a first string with one or more data records by any suitable means and/or mechanisms. For example, the data conditioning framework 120 may receive a request as described above in connection with step 305 of method 300, step 405 of method 400, step 505 of method 500, or as in step 605 of method 600. In one embodiment, the data conditioning framework 120 receives a request to perform an approximate search of a record or string of the first data source 240a in the second data source 240b. In some embodiments, the request may include using one or more match criteria 225. In other embodiments, the request may identify one or more metric indexes 230, 230' to use for the approximate search. For example, in one embodiment, the data conditioning framework 120 receives a request to approximately match a string with a data element of one or more records of a data source 240.

At step 710, the data conditioning framework 120 obtains, provides or otherwise identifies a set of one or more alternative data elements for the data element of the record or data source 24 to be searched or matched. In one embodiment, the data conditioning framework 120 has one or more lookup tables 275 having one or more alternative data elements related to or associated with the reference data element. In one embodiment, the reference data element is used as an index to the lookup table. In another embodiment, the lookup table 275 may comprise a hash table and a hash value of the reference data element is used as an index. In some embodiments, the alternative data elements 275 are provided, stored or located in a data source 240. In other embodiments, the data conditioning framework 120 provides the alternative data elements via a file. In yet another embodiment, the data conditioning framework 120 provides the alternative data elements 275 via a database, such as in one or more tables. In one embodiment, the data conditioning framework 120 obtains the alternative data elements 275 via a query or application programming interface call (API) to a database, another application or information system, such as knowledge base, contact information system, email system, ERP or CRM system.

In one embodiment, the data conditioning framework 120 may deploy domain knowledge of the reference data element to provide alternative data elements. By way of example and in view of the CleanCRM application to be described below, the domain knowledge 275 for the alternative data elements may be related to any type and form of person, institute and location data 250. In some embodiments, one or more of the following eight domain knowledge lookup information of alternative data elements may be used in practicing an embodiment of this technique: 1) Country, 2) Zip code, 3) Nicknames, 4) Address Conventions, 5) Business Designations, 6) City words, 7) Top 1000 companies, and 8) Secondary unit designators. In the example case of country and region domain knowledge, the data conditioning framework 120 provides alternative data elements referring to, identifying or otherwise representing a country or regions in the country. For example, the following table 275 identifies alternative data elements for the reference data element USA and respective regions, e.g., states of the USA:

USA, US, United States of America, America
USA, AL, Alabama, bama
USA, AK, Alaska
etc. . . .

In one embodiment, the data conditioning framework 120 provides alternative data elements 120 referring to, identifying or representing the relationship between USA state, cities, and zip codes. The following tables identifies some example alternatives:

01021, Chicopee, Mass.
01022, Chicopee, Mass.
01026, Cummington, Mass.
01027, Easthampton, Mass.
etc. . . .

In another embodiment, the data conditioning framework 120 provides nicknames referring to, identifying or representing the relationship between different ways to represent first names as in the following table 275:

Abigail, Abigail, Abby, Abbie
Abraham, Abraham, Abe
etc. . . .

In some embodiments, address conventions domain knowledge is used in referring to, identifying or representing the relationship between different ways to represent different address conventions, such as North American address conventions. For example, the following table 275 identifies alternatives for alley and annex reference data elements, which may be found in an address record of a data source 240:

Alley, Alley, Aly, Alley
Annex, Annex, Anx, Annex
etc. . . .

In yet one embodiment, the data conditioning framework 120 provides alternative business designations referring to, identifying or representing the relationship between different ways to represent different business designations as in the following example table 275:

LLP, Limited Liability Partnership
Corp, Corporation
LLC, Limited Liability Company
Inc., Incorporated
Ltd., Limited
etc. . . .

In other embodiments, the data conditioning framework 120 provides alternative ways to refer to, identify or to represent words in city names. For example, the following table 275 identifies alternatives for the words of Beach and Bluff that may be found in a record having a city name:

Beach, Bch
Bluff, Bif
etc. . . .

In some embodiments, the data conditioning framework 120 may provide alternative data elements to identify, or refer to the different ways to represent the common names of the top 1000 companies. For example, the following table 275 identifies alternative names for 3Com and Abbott:

3Com, 3Com, ThreeCom
Abbott Laboratories, Abbott Laboratories, Abbott Labs, Abbott
etc. . . .

In another embodiment, the data conditioning framework 120 provides alternative data elements to identify, or refer to the different ways to represent secondary address unit designators. For example, the following table identifies alternative secondary address unit designators for Apartment and Basement:

Apartment, Apartment, Apt, Apart, Aprtmnt
Basement, Basement, Bsmt
etc. . . .

Although the domain knowledge and alternative data elements are generally described above with examples of PIL information and corresponding example tables, the technique depicted in FIG. 7 and the data conditioning framework 120 may use a vast array of different alternative data representations and different lookup or table information for other types of PIL information and non-PIL information. For example, the data conditioning framework 120 may provide alternative data elements to identify or represent first, nicknames, and/or last names by country. In another example, the data conditioning framework 120 may provide alternative data elements to identify or represent companies or business in a state, county, country or other area by size, type, industry or otherwise. In one example, the data conditioning framework 120 may provide alternative data elements to identify or represent data elements, values, fields or records of a ERP, PDM, PLM, SCM or LIMS information system.

Still referring to FIG. 7, and in further detail, at step 715, the data conditioning framework 120 and/or approximate matching engine 210 performs an approximate search or match for the first string requested in step 705 with the reference data element and any of the alternative data elements. In some embodiments, the data conditioning framework 120 deploys any of the matching and/or searching techniques described in conjunction with methods 300, 400, 500 and/or 600. In one embodiment, the data conditioning framework 120 uses one or more match criteria 225 during the approximate matching. In another embodiment, the data conditioning framework 120 uses one or more metric indexes 230 during the approximate matching.

In some embodiments, the data conditioning framework 120 performs an approximate match of the first string to the reference data element and each of the alternative data elements. In other embodiments, the data conditioning framework 120 performs an approximate match of the first string to the reference data element, and if the reference data element exactly matches or approximately matches within a predetermined threshold, the data conditioning framework 120 skips the alternative data elements. In another embodiment, the data conditioning framework 120 performs an approximate match of the first string to the alternative data elements until finding an approximate match within the predetermined threshold. In yet another embodiment, the data conditioning framework 120 performs an approximate match of the first string to the alternative data elements and identifies all of the alternative data elements approximately matching the first string within a predetermined threshold. In some embodiments, one or more of the reference data element and alternative data elements may approximately match the first string within a predetermined threshold.

At step 720, the data conditioning framework 120 provides a result of the approximate match between the first string and the reference data element and/or alternative data elements within a predetermined threshold. In one embodiment, the data conditioning framework 120 provides the approximate match of the reference and alternative data elements having the closest or best approximate match with the first string. For example, a reference data element and one of the alternative data elements may both approximately match the first string within the predetermined threshold but the alternative data element more closely matches the first string. As such, in this example, the data conditioning framework 120 may provide the alternative data element as the result. In other cases, although the alternative data elements are searched for an approximate match, the reference data element may provide the closer approximate match to the first string and identified as the resulting match. In other embodiments, the data conditioning framework 120 may provide a plurality of results approximately matching the first string, such as the reference data element and one of the alternative data elements, or a plurality of the alternative data elements. For example, a user of an application or the data conditioning framework 120 may selected the desired approximately matching data element from the plurality of the results. In some embodiments, the data conditioning framework 120 may reduce the plurality of results by approximately matching to one or more match criteria 225, or using one or more metric indexes 230.

Although the domain knowledge technique of method 700 is generally described with domain knowledge information related to people, institute and locations, the domain knowledge information may comprise data relevant to any type of system, such as a PDM, PLM, SCM, ERP, LIMS or other information system. As such, in some embodiments, the technique of method 700 may be applied according to the data, information, terms, terminology, and language related to the domain of the information system. In one embodiment, the domain knowledge technique described herein may be applied to any of the following domains of information: 1) accounting or financial system, 2) manufacturing, 3) product data management, 4) product life cycle management, 5) enterprise resource planning, 6) supply chain, 7) lab information systems, 8) bioinformatics systems and 9) life sciences information systems.

Furthermore, any of the techniques of methods 300, 400, 500, 600 and 700 described in conjunction with FIGS. 3, 4, 5, 6, and 7 respectively may be used alone or in any combination with each other. In one embodiment, the inexact trimmed matching technique of method 300 may be performed with the adaptive search ordering technique of method 400, the cascading search space reduction technique of method 500, the metric indexing technique of 600, and/or the domain knowledge matching technique of method 700. In another embodiment, the adaptive search ordering technique of method 400 may be performed with the cascading search space reduction technique of method 500, the metric indexing technique of 600, and/or the domain knowledge matching technique of method 700. In a further embodiment, the cascading search space reduction technique of method 500 may be performed with the metric indexing technique of 600, and/or the domain knowledge matching technique of method 700. In yet another embodiment, the metric indexing technique of 600 may be performed with the domain knowledge matching technique of method 700.

In view of the structure, functions and operations of the data conditioning framework 120 and approximate matching and searching techniques, any type and form of application may use, incorporate, integrate or embed the data conditioning framework 120. For example, the data conditioning framework 120 may be used to "cleanse" data of a data source 240, such as a CRM system. Cleansing data may include removing duplicates, fixing typos or misspellings, changing names to formal names or to standard naming conventions, correcting case types, correcting incorrect information, such as addresses and contact information, and filling in missing information. Referring now to FIGS. 8A-8H, an example of an application using the data conditioning framework 120, referred to as CleanCRM 800 is illustrated. In one embodiment, the CleanCRM application 800 plugs into a CRM system to standardize data and merge duplicate information. The application 800 uses the techniques described herein to find matches in nicknames, abbreviations or misspellings. Furthermore, the application 800 applies standardization rules 260 automatically to cleanse addresses, fill in missing zip codes, and correct abbreviations and casing. All fields, including custom fields, in the CRM tables may be cleansed. Through a simple wizard interface, the CleanCRM application 800 de-duplicates, informally referred to as de-duping, and standardizes both external lists prior to a CRM import, and the existing CRM system.

In one embodiment, CleanCRM 800 is a work flow or wizard type application with eight screens as depicted in FIGS. 8A-8H. The user traverses from one screen to the next screen by filling in the information on each screen before proceeding in a linear fashion to the next screen. In some embodiments, the CleanCRM application 800 performs user constraint checking. For example, before transitioning to the next screen, the user must perform certain actions, with each screen's required actions being dependent upon the screen and sometimes dependent upon the mode of operation. Each of the screens of the application 800 will be described with a list of constraints per screen that may be applied.

Figure 8A:
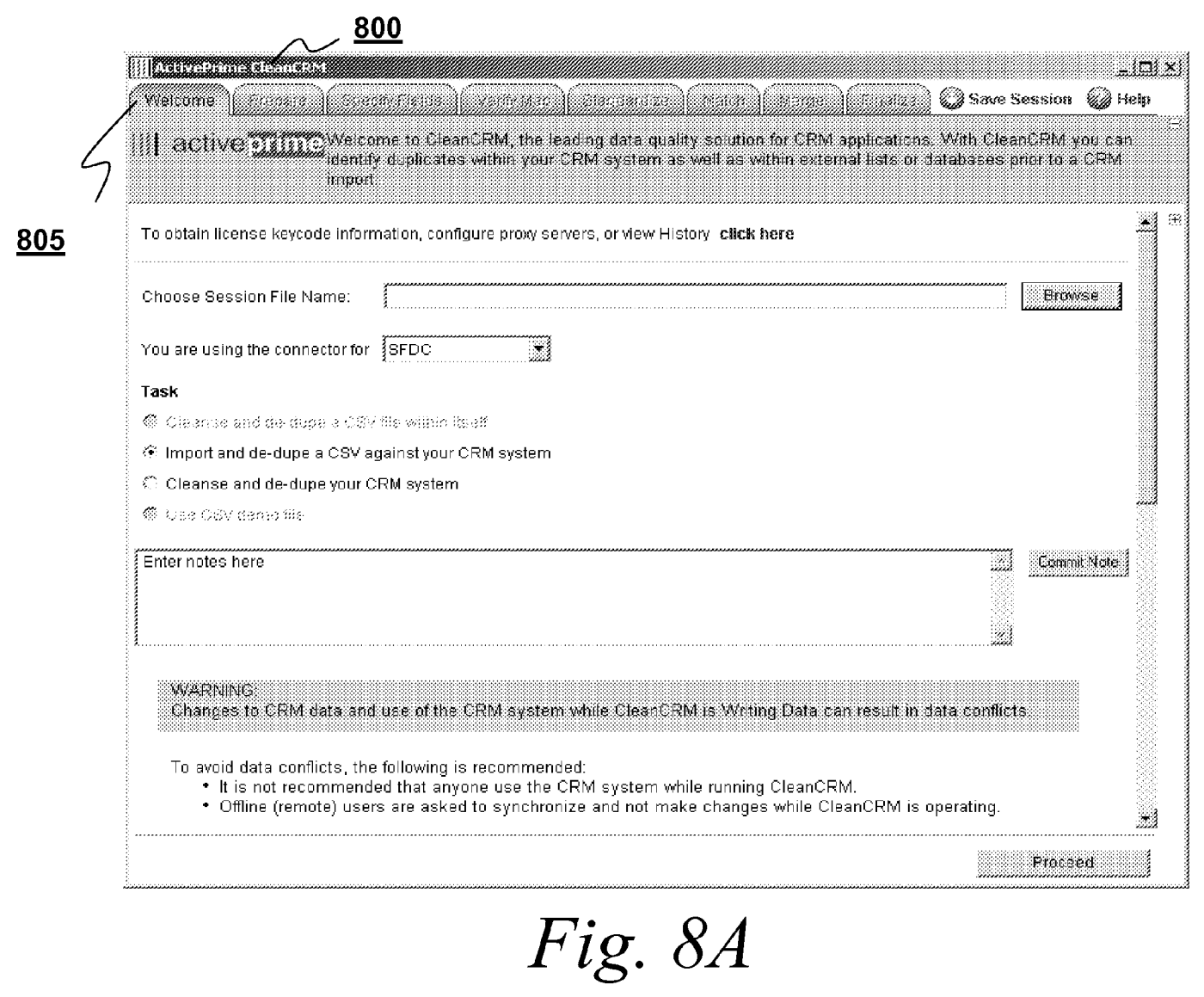

Referring now to FIG. 8A, the application 800 provides a Welcome Screen 805 which in one embodiment, has no user constraints. At the top of the screen, the license, proxy and history configuration information is identified via the text and uniform resource locator (URL) or hyperlink: "To obtain license keycode information, configure proxy servers, or view History click here." A user may click on the link to bring up a box with the license, proxy and history information. The history information displays information about usage of CleanCRM. A refresh button may be selected to show updated Archived Batch Data Set information in a grid or tabular format. Each row of the grid corresponds to a particular Archived Batch Data Set and contains information on the entity processed, the connector used, the mode in which a user ran a CleanCRM session, the size of the log file, the number of unprocessed records, the version of CleanCRM 800 used, and any notes the user committed during the session. The user can view the data files comprising each archived batch data set, by clicking on the desired Archived Batch Data Set. The license information displays the permissions the user may have with CleanCRM 800. The proxy information allows the user to configure a proxy server for use with or by the application 800. For example, a Network tab may display the proxy settings, which may be customized or changed. The Welcome Screen 805 also identifies the connectors 235 being used. In the license information and configuration, a connectors tab allows a user to install connectors 235 to run with CleanCRM 800.

The Welcome Screen 805 also provides a task selection mechanism for the user to select the type of task for using the application 800 to cleanse data. The user may have the following task options: 1) Cleanse and de-duplicate (e.g. remove duplicates) a CSV file 240 within itself, 2) Import and de-deduplicate a CSV 240a against a CRM system 240b, 3) Cleanse and de-duplicate a CRM system 340, or 4) use a CSV demo file 240. For the Cleanse and de-duplicate a CSV file within itself task, or CSV-CSV mode, the application 800 cleanses data from a single CSV file 240 (no CRM system is involved). In one embodiment, the Source data file is the CSV file 240a which needs to be cleaned, and the Target data file 240b, which is also in CSV format, comprises the cleansed data. In some embodiments, the CleanCRM application 800 leaves the data in the original source file unchanged. In one embodiment, all cleansing changes are written to the Target file 240b. Thus, with this option, the user retains the original data file (the source file) as well as obtaining a cleansed data file (the target file). For the Import and de-duplicate a CSV against your CRM system task, or CSV-CRM mode, the data from a separate CSV file 240a is cleansed and merged into an existing CRM database 240b. The Source file 240a is the CSV file to be cleansed and integrated into the CRM system. The Target file 240b comprises a selected group (subset) of records from the CRM system that the CSV file is to be imported and de-duplicated against. In one embodiment, the data in the CSV file is compared to the data in the subset of the CRM system. This comparison is made in order to identify duplicates and inconsistencies that may exist. Once CleanCRM cleanses the CSV source file, in one embodiment, the application 800 then integrates and merges the content into the target CRM system.

For the Cleanse and de-duplicate your CRM system task, or CRM-CRM mode, the CleanCRM application 800 cleanses a selected portion of a CRM database 240. In this embodiment, the user selects a subset of data records from the CRM system 240 to be cleansed by CleanCRM 800. In this option, the selected subset of the CRM system now has cleansed data, and the original CRM data is not retained. For the Use CSV demo file task, or CSV-CSV mode, the application provides this mode for first time users of CleanCRM 800. The demo file 240 includes dummy data, which may be used for demo and practice purposes.

The Welcome Screen 805 enables a user to use a previously saved session, by entering the session in the Choose Session File Name location. Sessions may be stored in a file having the extension '.ses'. The user may also click the browse button to navigate to a session file. With the saved session, connector, task, and entity under which the session was saved will be applied. In the notes section of the Welcome Screen, the user may a comment or note about the run of the CleanCRM session the user wishes to save. The user can type into the box any desired text. When done, the user selects or clicks the Commit Note button to save the note. In one embodiment, the note will be saved as a text file in the Archived Batch Data Sets folder with the first 20 characters of your note as the title.

Figure 8B:
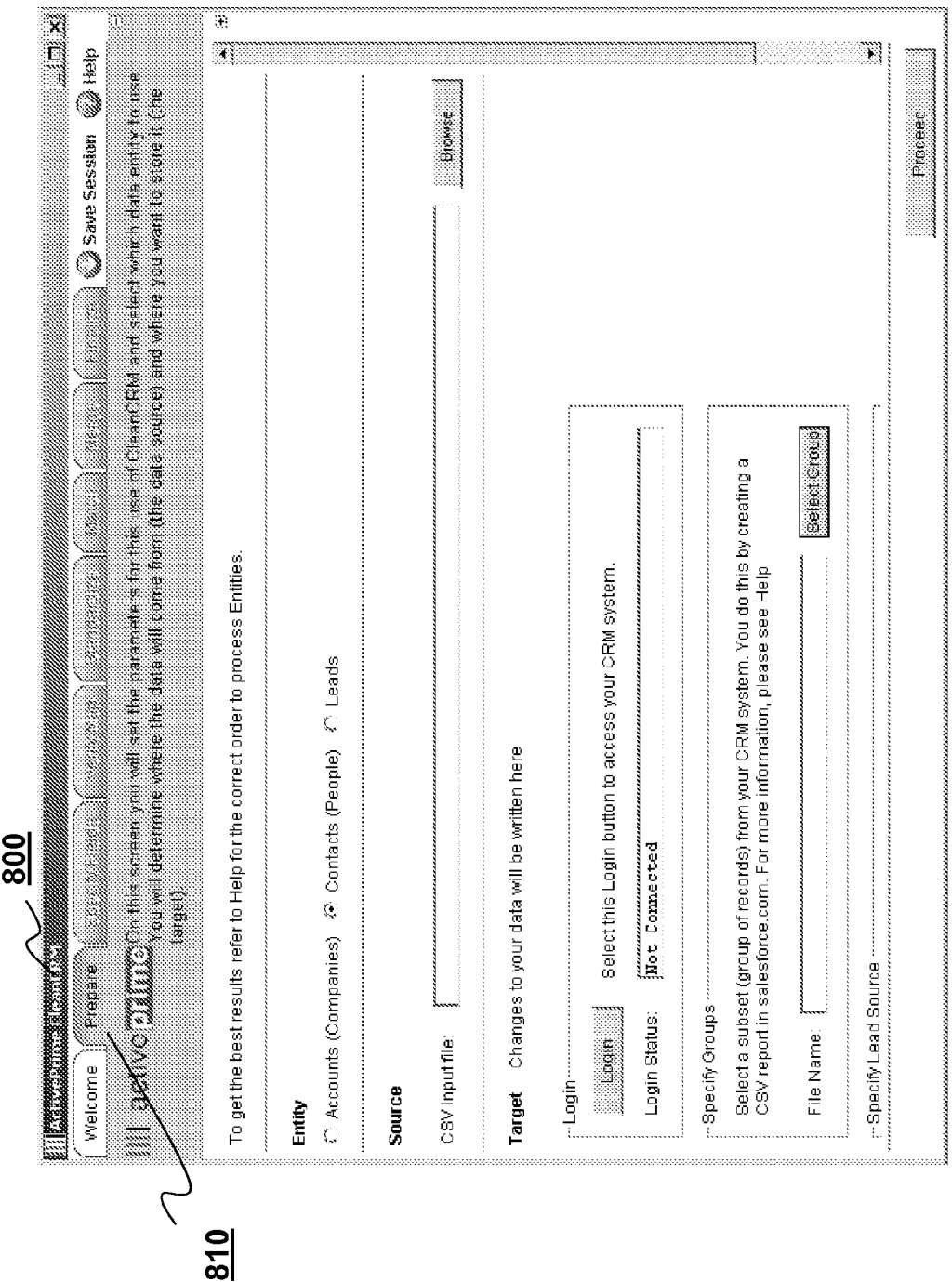
Figure 8C:
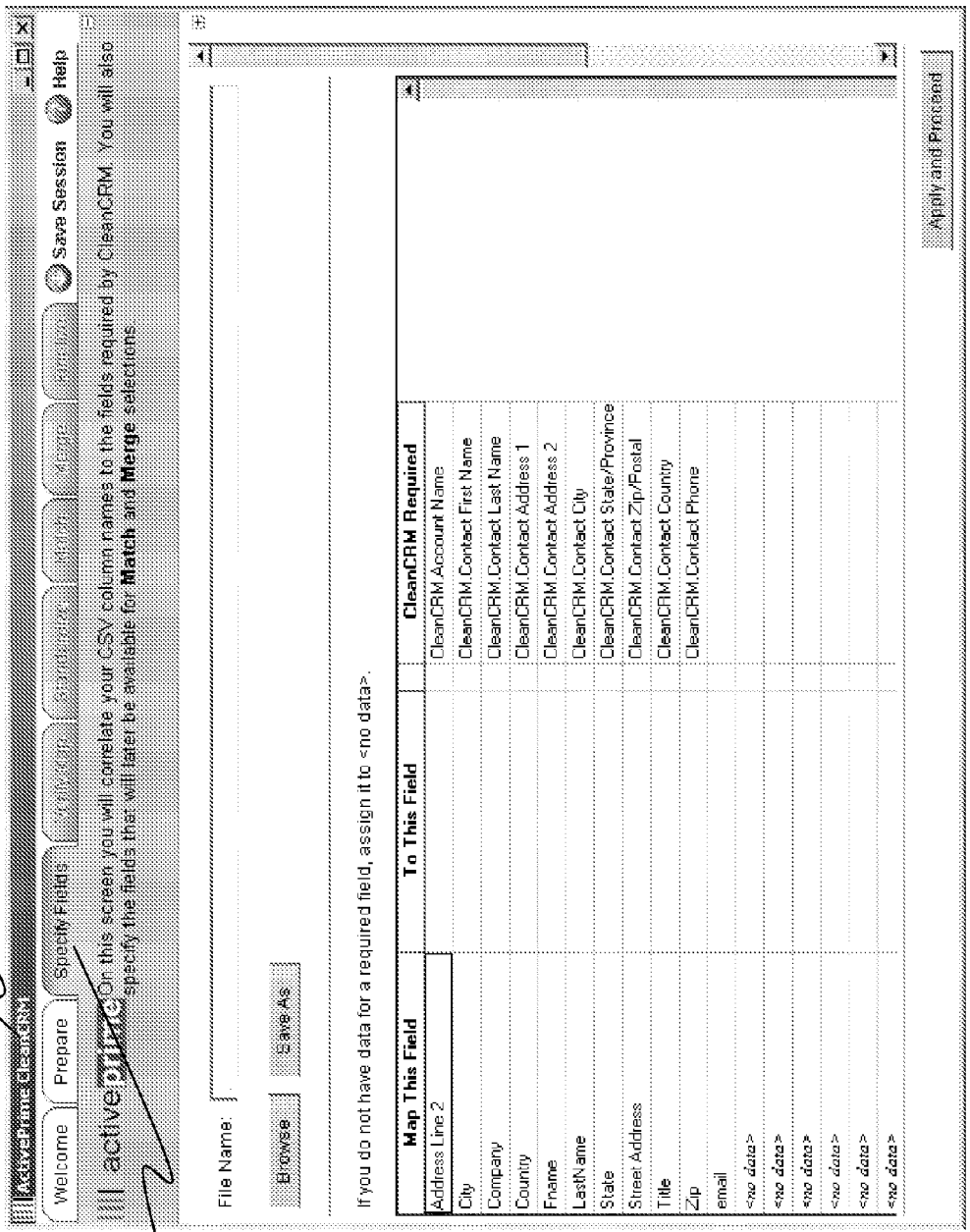

Referring now to FIG. 8B, an example prepare screen 810 of the application 800 is depicted. In some embodiments, the user constraints may include that the data source and targets must be specified and they must be valid sources and targets. In other embodiments, if connecting to a CRM system that requires a user login and password, then one constraint may be that the user must have successfully logged in. In this screen 810, the user will set the parameters for use of the application and select which data entity to use. The user will select a source data source 240a and target data source 240b. If cleansing data within the CRM system only (no CSV file), the user processes Accounts first and then Contacts. When Importing and de-duping a CSV file into the CRM system, the user may need to run CleanCRM multiple times. In some embodiment, if both Account and Contact information is in the CSV file, the user may need to process the Contacts data first in CleanCRM 800, then Accounts. In other embodiments, CleanCRM 800 will insert the CSV Contacts into existing Accounts in the CRM as long as another Contact belonging to that Account is included in the groups report of the CRM. After the Contact data has been imported, in some cases, the user must run CleanCRM again to import the Account data in the CSV file. In one embodiment, after Account and Contact data has been imported, the user may also need to run CleanCRM 800 to Cleanse and de-duplicate the CRM system in case duplicate Accounts are created. In some embodiments, this may only be necessary when importing Contacts, and the CRM groups report did not have Contacts belonging to matching Accounts in the CSV file.

In the source section of the Prepare Screen 810, the user selects a source file of data 240*a* to be processed by CleanCRM 800. When Cleansing and de-duping a CSV file within itself or Importing and de-duping a CSV file against a CRM system, the source 240*a* will be a CSV file. When Cleansing and de-duping a CRM system, the source may be a subset of records in the CRM system 240*a*. The user has the option of Basic Grouping or Advanced Grouping for the CRM source selection. Basic Grouping will use records in the CRM system 240*a* that have Account Names starting with the letters indicated in the selection. Advanced Grouping uses a group of CRM records that the user has assembled for a run of CleanCRM 800.

In the target section of the Prepare Screen 810, the user selects a target 240*b* where CleanCRM will write the cleansed data. When Cleansing and de-duping a CSV file within itself, the Target 240*b* will be a CSV file that CleanCRM 800 will create upon writing the data. When Importing and de-duping a CSV file into a CRM system, the target 240*b* will include a subset of records from the CRM system 240*a*. The user may have the option of Basic Grouping or Advanced Grouping for the Target selection. As described above, the Basic Grouping will use records in the CRM system that have Account Names starting with the letters indicated in the user selection, and Advanced Grouping uses a group of CRM records that the user has assembled for a run of CleanCRM 800. In one embodiment, the user does not need to select a Target when Cleansing and de-duping the CRM system.

Referring now to FIG. 8A, an example Specify Fields screen 815 of the application 800 is depicted. In one embodiment, the user constraint for this screen 815 is that all required CleanCRM fields must have source fields mapped into them. In some embodiments, the user constraint may include the mapping of a subset of CleanCRM fields to the source fields are required. On the Specify Fields screen 815, the user maps column/field headings from the Source CSV file 240*a* to corresponding CleanCRM field headings 240*b*. In one embodiment, these fields are used in the Matching and Merging steps of the CleanCRM application 800. In another embodiment, the user does not have to Specify Fields when cleansing the CRM system 240. In some embodiments, in order to choose data in conflicting fields on the Merge screen 835, those fields have to be specified in this screen 815. If the user does not Specify fields, the user may choose fields from a Master Record.

Further to the Specify Fields screen 815, when Cleansing and de-duping a CSV file or Importing and de-duping a CSV file against a CRM system, the user may also specify additional fields in order to carry the data through CleanCRM 800. These fields do not necessarily need to be used for Matching or merging purposes. For example, a user may want to carry through data regarding the Contacts' birth dates from the CSV file 240*a*. The user can simply check off this field under the Specify Additional Fields section of the screen 815, and the birth dates will be carried through to the Target 240*a*. In some embodiments, if the CSV file 240*a* does not have column headers, CleanCRM 800 will assign each column a number to appear onscreen. If the user is unable to work with your data in this form, the user may exit CleanCRM 800, insert column headers into the CSV file 240*a*, and restart CleanCRM 800. The way in which fields are mapped to the CRM system may be specific to each system.

Figure 8D:
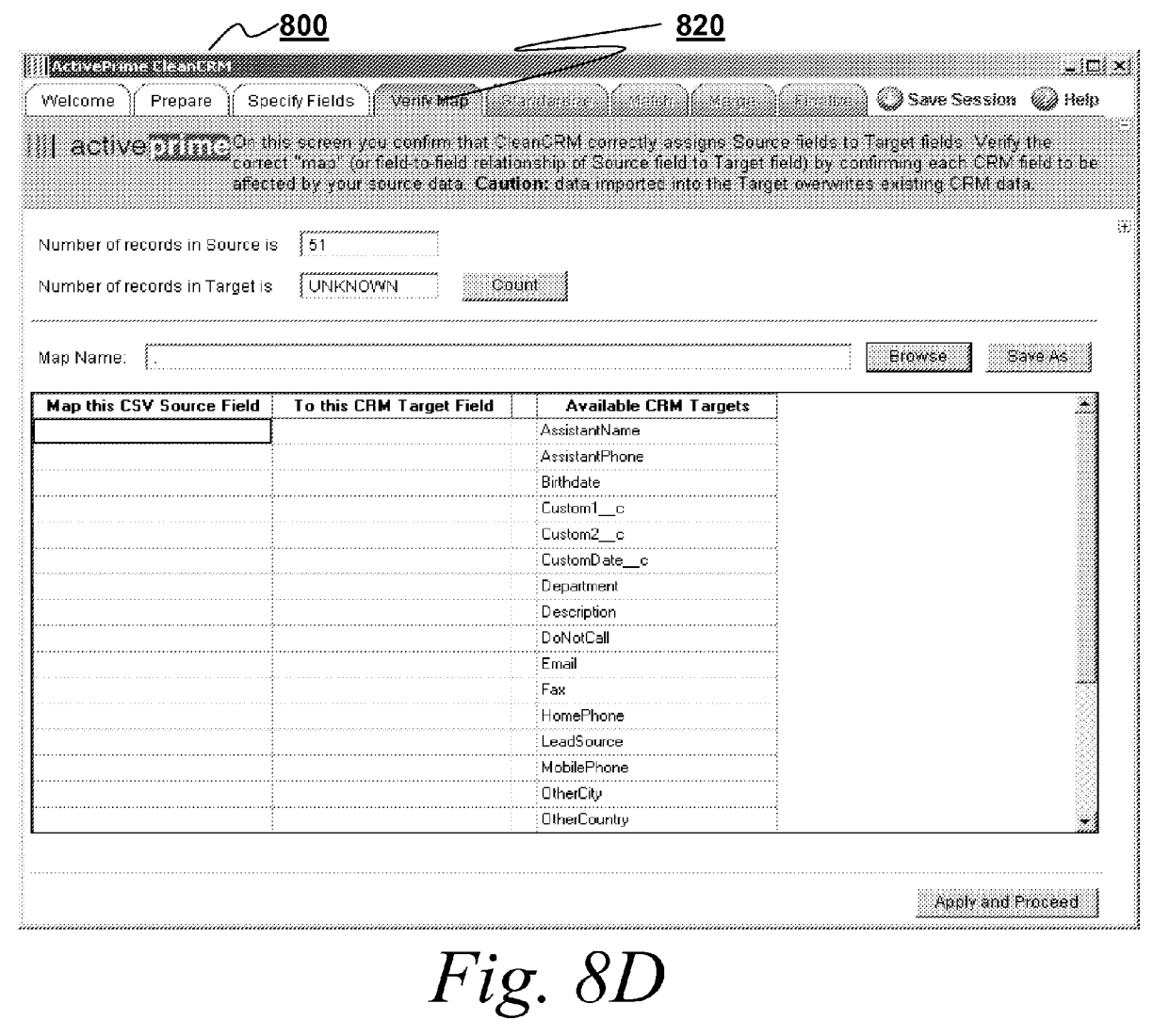

Referring now to FIG. 8D, an example Verify Map Screen 820 of the application 800 is depicted. In one embodiment, the user constraint for this screen 810 may be that any additional fields that where mapped in from the Verify Fields Screen must all be mapped to target fields. In some embodiments, the Verify Map Screen 820 is used when importing a CSV file 240*a* into a CRM system 240*b*. In other cases, the user may skip the process of this screen 8210 and immediately click Apply and Proceed button to move to the next screen.

The Verify Map screen 820 is used to map data to fields in addition to the CleanCRM Required fields on the Specify Fields screen 815. The fields that will be mapped on this screen 820 are determined by the additional fields the user checked off on the bottom portion of the Specify Fields screen 815. For example, the user may wish to map data in fields that do not match any of the standard fields. In some embodiments, the CRM administrator can create custom fields in the CRM system 240 for these data fields prior to the import process.

At the top of the screen, there are numbers that indicate the number of records in the Source 240*a* and Target file 240*b* database, which will be cleansed by CleanCRM 800. These numbers can assist the user in estimating the time it will take for CleanCRM to run the cleansing session.

Figure 8E:
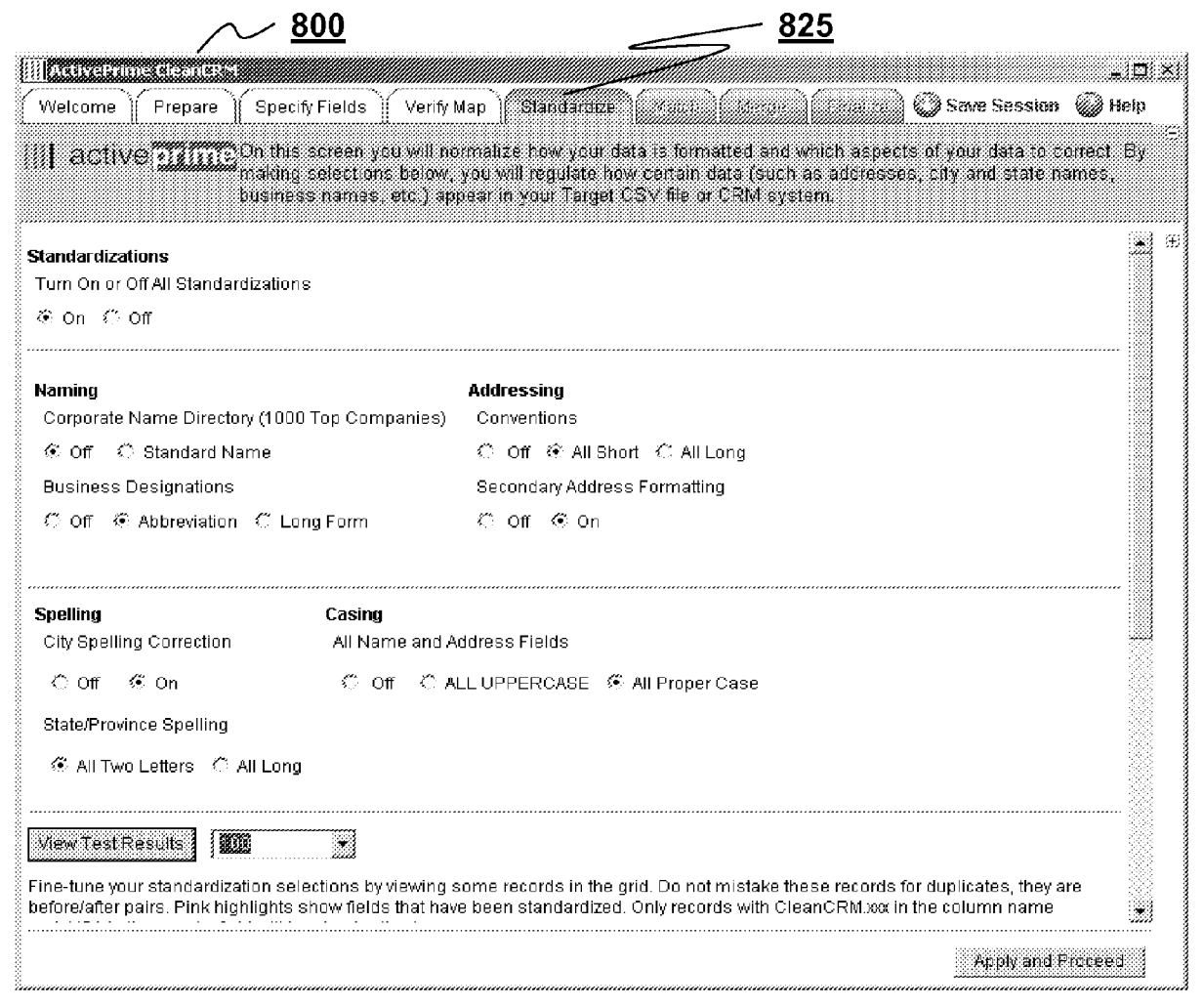

Referring now to FIG. 8E, an example Standardize Screen 825 of the application 800 is depicted. In one embodiment, the user constraint for this screen 825 includes displaying a dialog warning to the user if the user did not "View Test Results" for the standardization settings on this screen. In some embodiments. The user may want to verify how the standardization settings change the data. In another embodiments, this dialog box is just a reminder and does not appear if the user has indeed selected "View Test Results". Also, in some embodiments, if all standardizations are turned off, then the dialog does not appear because no changes will be applied to the data. Standardizations or standardize rules 260 will format the appearance of the processed data records. In one embodiment, the rules 260 are only applied to the CleanCRM 800 Required data fields.

In the Standardize Screen 825, the section of Turning Standardizations On identifies the following in this CleanCRM 800 example:

States will appear either in all long form or all short form, depending upon user selection.

If no zip code is specified in a particular record of the CSV or CRM database, CleanCRM will fill in the appropriate zip code that corresponds to the specified city name. However, if the city has more than one zip code associated with it (e.g. New York, Chicago), CleanCRM will leave the zip code field blank.

If a zip code is specified but there is no city name or state, CleanCRM will fill in the appropriate city name and state that correspond with the specified zip code.

Punctuation will be removed from the Corporate Name Directory companies, Business Designations, Addressing Conventions, Secondary Address Formatting, and two-letter State Abbreviations.

Other selected standardizations will be applied.

If the Standardizations are turned off, then the above-described features may not be applied during the cleansing process of CleanCRM 800. In some embodiments, when cleansing and de-duping a CSV file or a CRM system, standardizations 260 are applied to all records that CleanCRM 800 is processing. In other embodiments, when Importing and de-duping a CSV file against a CRM system, standardizations 260 are applied to the records in the CSV file. In one embodiment and in order to get Standardizations to be applied to the CRM records, the user must run CleanCRM 800 again with the task to Cleanse and de-duplicate your CRM system.

In some embodiments, the naming standardizations 260 are applied to businesses in the Account/Company Name fields in the records as depicted by the Naming section of the Standardize screen 825. The Corporate Name Directory 275 is an example of a directory of alternative representation of names of the Fortune 1000 companies. In one embodiment, if Standard Name is selected, CleanCRM 800 will access this database 275, and ensure the standard spelling and business designations for the Accounts/Companies that are a part of the Fortune 1000 directory. Business Designations selection of the Naming section of this screen 825 determines the format of the Account/Company designations (Incorporated, Corporation, University, etc.). In one embodiment, selecting Abbreviation will rewrite all designations in abbreviated form (Inc, Corp, Univ, etc.). In another embodiment, selecting Long Form will rewrite all designations to their full, unabbreviated form. Selecting Off will disable the particular Naming standardization 260 and leave the Account/Company Name data in the original format before being processed by CleanCRM 800.

In the Addressing section of the Standardize screen 825, standardizations 260 may be applied to the address fields of the records. In one embodiment, the Conventions selection will determine the format of the conventions of the addresses. In some embodiments, the option All Short sets all conventions in an abbreviated form (St, Ave, Blvd, etc.). In other embodiments, the option All Long sets all conventions to their full, unabbreviated form (Street, Avenue, Boulevard, etc.). In another embodiment, the Secondary Address Formatting selection will format the separation of common secondary address, e.g., Address2, data from the primary address field, e.g., Address1 field. In some embodiments, selecting On enables CleanCRM 800 to recognize and separate the Address2 data (PO Box 123, Unit 100, Suite 23, etc.) from the Address1 data (123 Main St, 456 James Blvd) into their appropriate fields. In other embodiments, selecting Off will disable the Addressing standardizations 260 and leave the Address1 and Address2 data in the original format before being processed by CleanCRM 800.

In the Spelling section of the Standardize Screen 825, the standardizations 260 may be applied to the City and State/Province fields of the data. In one embodiment, the City Spelling Correction applies an automatic spell-check for many common cities and towns. In some embodiments, selecting Off will disable the spell-check and leave the city names unchanged. In other embodiments, the State/Province Spelling determines the format of the states and provinces in the data. In another embodiments, selecting All Two Letters will set all state/province names to a common two-letter abbreviation (MA, CA, TX, etc.). In yet another embodiment, selecting All Long will set all state/province names to a full, unabbreviated form (Massachusetts, California, Texas, etc.).

In the Casing section of the Standardize screen 825, standardizations 260 regarding casing may be applied to Name and Address fields. In one embodiment, the Casing option determines the written format of the data. In some embodiments, selecting ALL UPPERCASE will set the text of every record in uppercase letters, for example: ABC CORP, JOHN SMITH, 123 SMITH AVE, WONDERLAND, etc. In other embodiments, selecting Proper Case capitalizes the first letter of each word and sets the remaining letters in lowercase, for example: Example: Abc Corp, John Smith, 123 Smith Ave, Wonderland, etc. In yet another embodiment, selecting Off will leave the data in the original casing format before being processed by CleanCRM 800.

Figure 8F:
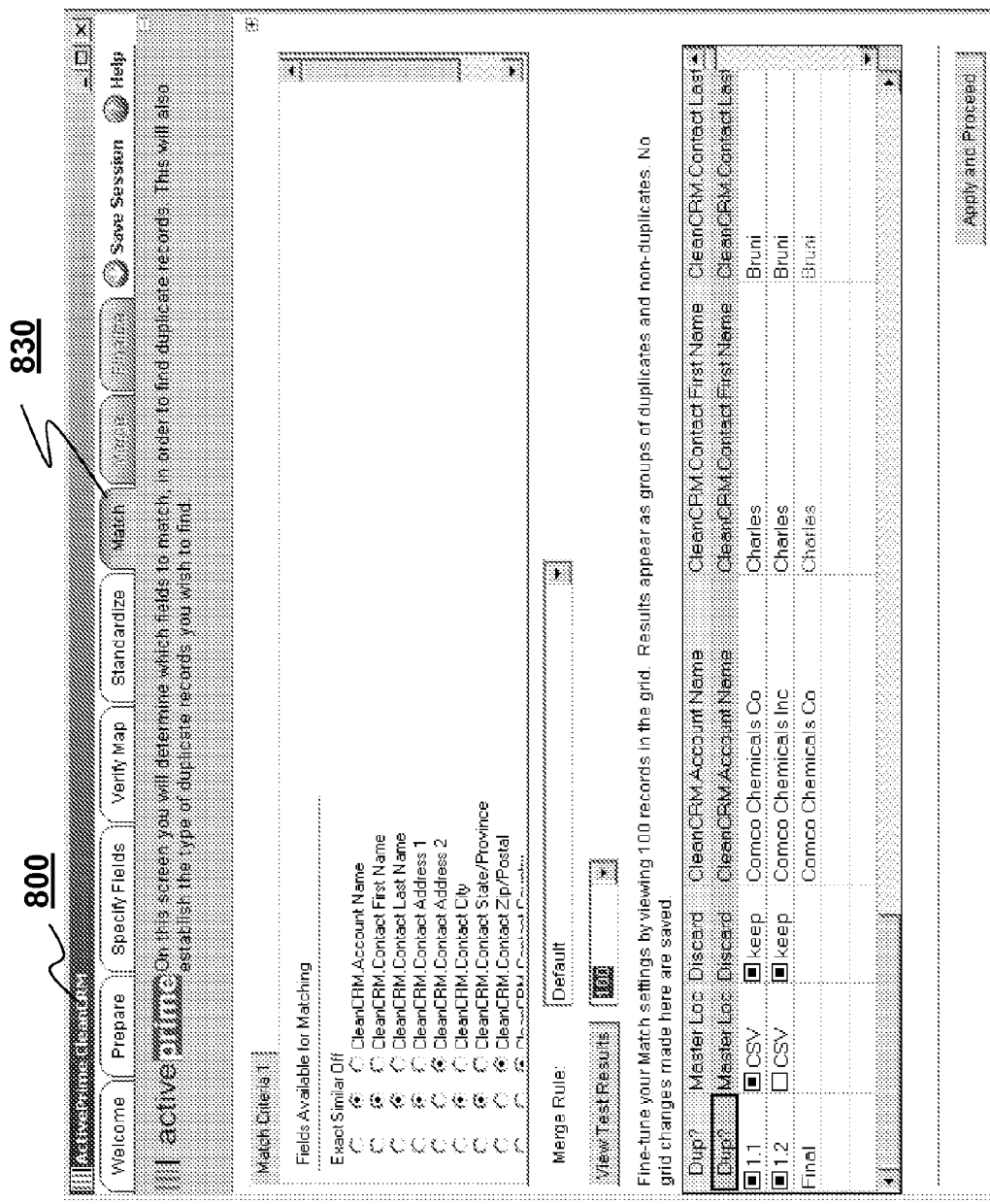

Referring now to FIG. 8F, an example Match Screen 830 of the application 800 is depicted. The Match Screen 830 is used to determine which fields to match in order to find duplicate records. In some embodiments, this screen 830 is also used to establish the type of duplicate records the user desires to find. In one embodiment, the user constraint for this screen 830 includes displaying a warning dialog if the user did not selected "View Test Results" for the match settings on this screen 830. In some cases, the user will want to verify how the match settings calculate (find) duplicates. In one embodiment, this dialog box serves as a reminder to the user and does not appear if the user has selected "View Test Results".

In the Match Criteria 225 section of the Match Screen 830, the user can select which fields to use for matching by either an exact match or an approximate match, e.g., similar match. In one embodiment, if the user selects to search for similar records, CleanCRM 800 will apply matching algorithms and/or domain knowledge to determine records that are similar. In some embodiments, the application 800 will use any of the techniques of method 300, 400, 500, 600 and 700 described herein, alone or in combination to determine similar records. For example, CleanCRM 800 may identify similar records such as misspellings (Commcast and Comcast), phonetic matches (Klaus and Claus), nicknames (Dick and Richard, or Becky and Rebecca), company abbreviations (ABC and American Business Company), and numerical variances (7th Street and Seventh Street). In some embodiments, CleanCRM 800 will ignore punctuation and extra spaces when matching business designations (such as Inc or Co) and will overlook words not part of the official company name (such as The Toy Company and Toy Company). In other embodiments, when searching for exact duplicates, the application 800 will locate identical or exact matching records as duplicates. For example, the application 800 would match Toy Company as an exact match with Toy Company, but would not identify The Toy Co as a potential match to Toy Company. In another embodiment, CleanCRM 800 considers blank data fields in two different records to be matches. In other embodiments, a blank data field may not be considered a match with another field containing data.

In the Merge Rule section of the Match Screen 830, the Merge Rule 260 functionality sets which data from which record in a duplicate set CleanCRM 800 will automatically use when filling in Final Record values. Also, depending upon the task the user is running, the Merge Rule 260 may determine which record in the duplicate set is automatically selected as the Master Record. Each task to run in CleanCRM 800 may have different Merge Rules 260 available with various behaviors.

Figure 8G:
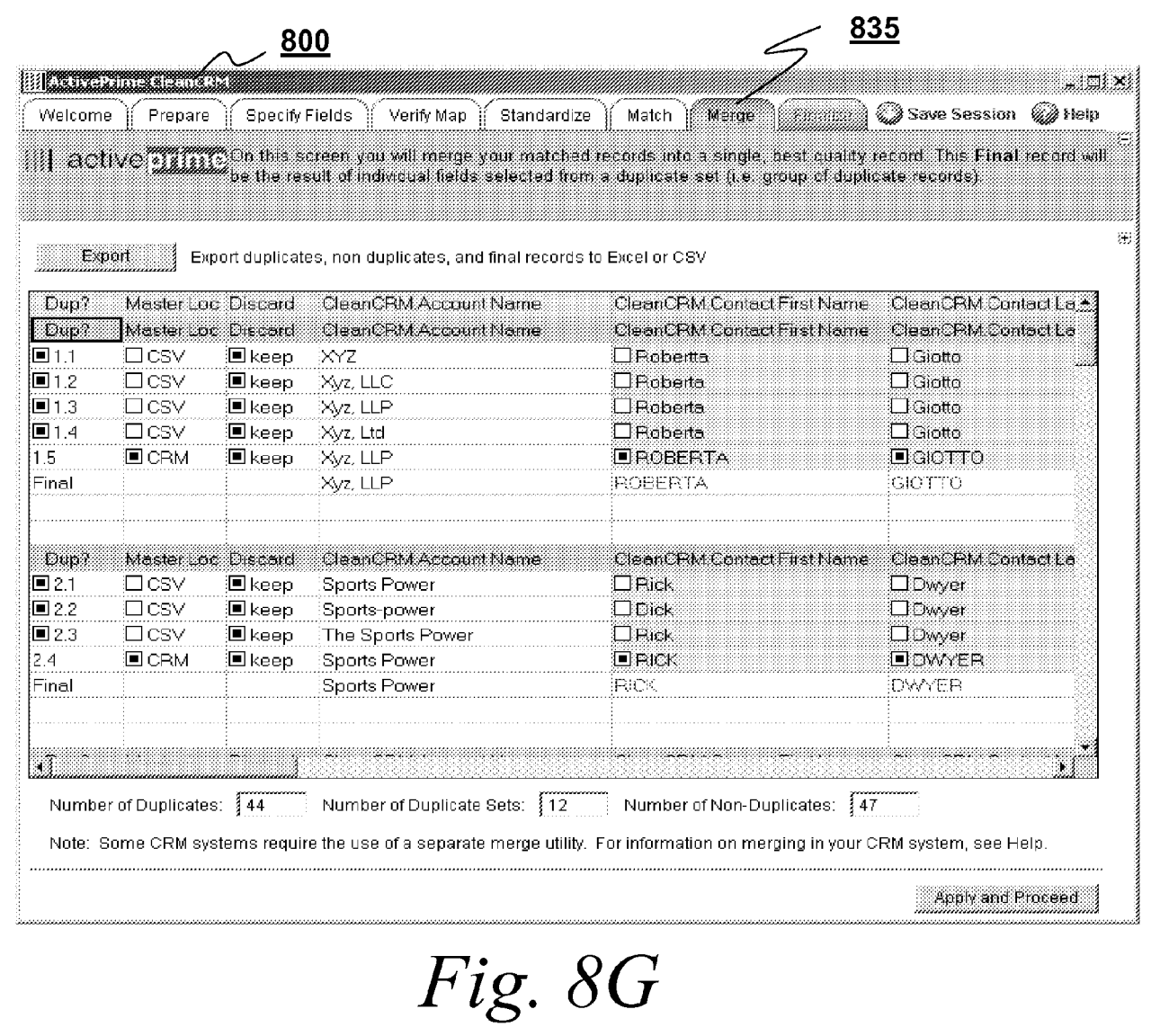

Referring now to FIG. 8G, an example Merge Screen 835 of the application 800 is depicted. In one embodiment, the Merge Screen 835 has no user constraints. In another embodiment, the Merge Screen 835 comprises a custom user constraint. In other embodiments, the Merge Screen 835 is used to merge matched records in to a single or final record. In some embodiments, the final record is a result of individual fields selected from a duplicate set, i.e., group of duplicate records. On the Merge screen 835, CleanCRM 800 displays the data records it is working with in Duplicate Sets. In one embodiment, CleanCRM 800 writes the Final Record to the target 240*b*. In another embodiment, the user uses the records in the duplicate set to customize the Final Record. In some embodiments, don-duplicates, or records that did not get matched up as duplicates, are displayed in the Non-Dups table below the duplicate sets. In other embodiments, the columns of data fields that are displayed in the Merge grid are those that are checked off at the bottom of the Specify Fields screen. The user may rearrange the order of the data columns by clicking on the column header at the top of the grid and dragging it either to the left or right. In some embodiments, any changes in column order will be saved to a Save Session. In another embodiment, all fields with a predetermined color, such a red, are referred to and identifies as Final Record fields, which are editable. The user may edit these fields by clicking in the desired field and typing over the existing data. Fields highlighted in another predetermined color, such as a second color or pink, may identify un-identical or conflicting data within a duplicate set that are being consolidated into the Final Record. The user may click on the radio button of the desired field to set its data value as the Final Record. In some embodiments, the Final Records will comprise data from the checked off field in any group of un-identical or conflicting data records. Fields highlighted in a third color, such as yellow may identify where data to which Standardizations 260 have been applied. In one embodiment, the user may middle-click (with the middle button or scroll-wheel of a mouse) to see these changes in a before-and-after view. In another embodiments, conflicting fields that have had standardizations 260 applied may only appear highlighted in the third color, such as yellow. Additionally, in some embodiments, indicated at the bottom of the screen 835 are the number of duplicates, duplicate sets, and non-duplicates found by CleanCRM 800.

Figure 8H:
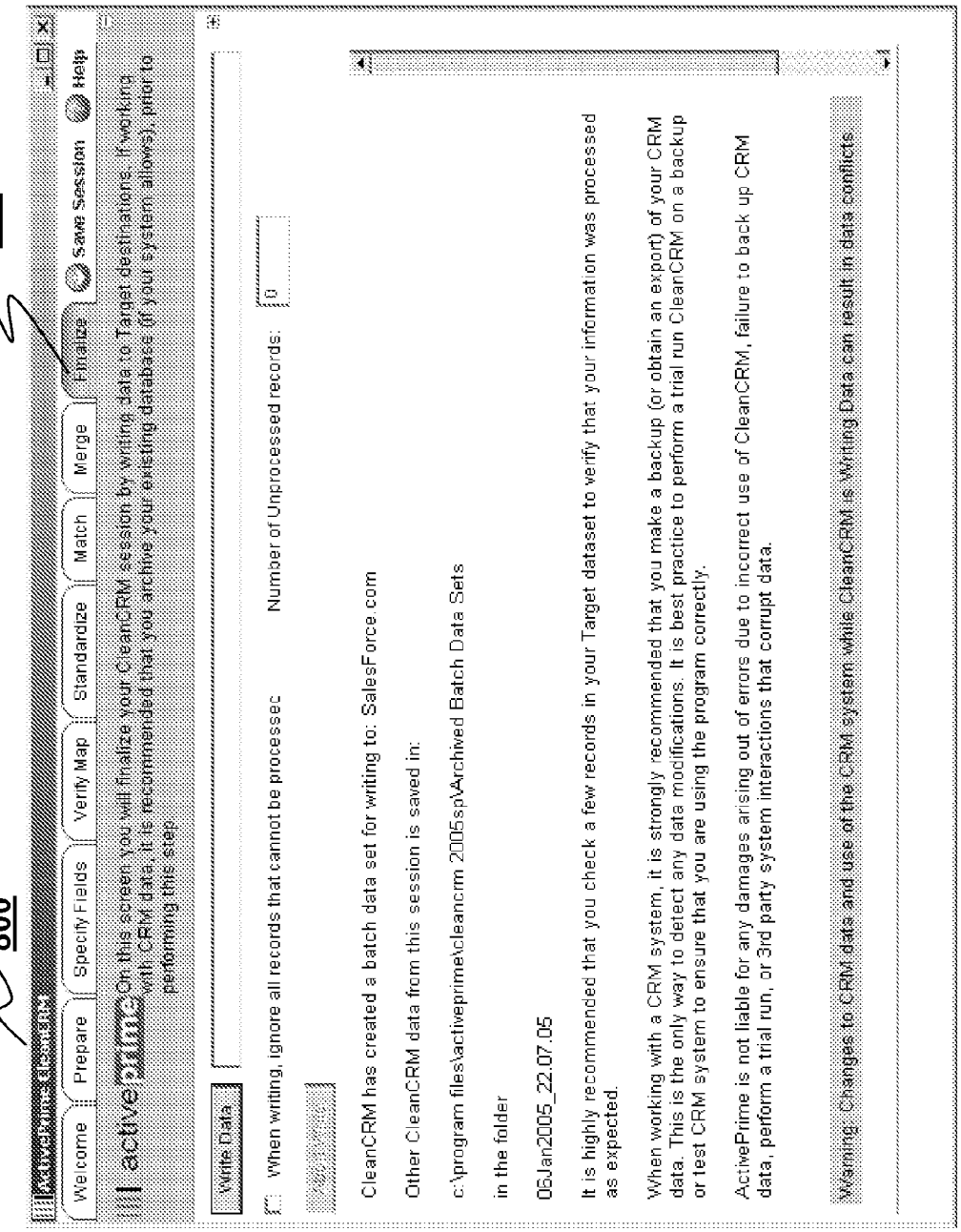

Referring now to FIG. 8H, an example Finalize Screen 840 of the application 800 is depicted. In one embodiment, the Finalize Screen 840 has no user constraints. In other embodiments, the user is notified via a dialog box if results were not written out to the target 240b. In the Finalize Screen 840, the user finalizes the CleanCRM session by writing data to a target destinations 240b. In some embodiments, in the Write Data section of this screen 840, the user clicks on the Write Data button to write the cleansed data to the Target 240b. In one embodiment, CleanCRM 800 will either create new records or update already-existing records in the Target 240, depending upon the task that is running and the status of the duplicate sets. In other embodiments, CleanCRM 800 may encounter a record that fails to be written to the Target 240b. In one embodiment, the user may check off the ignore option below the Write Data button to ignore these records and not be notified by a popup. Otherwise, in another embodiment, any time CleanCRM 800 encounters a record that fails to be written, a notification message will pop up, asking the user how to handle the write failure. In some cases, records that fail to be written, along with a reason for failure, are stored in a file, such as a file called UnprocessedWrite.csv in the Archived Batch Data Sets.

In some embodiments, when cleansing and de-duping a CSV file, the application 800 creates a new Target CSV file 240b that has been indicated on the Prepare Screen 810. In one embodiment, the Source file 240a remains unmodified. For Each Duplicate Set, the application 800, in another embodiment, writes the master record to the Target CSV file 240b according to its Final Record settings on the Merge Screen 835. In other embodiments, the application 800 writes any records unchecked from a duplicate to the Target CSV file 240b as separate records. For Non-Duplicate Records, the application 800 Each non-duplicate record is inserted into the Target CSV file 240b according to its Final Record settings on the Merge Screen 835.

In some embodiments, when importing and de-duping a CSV file against a CRM system, the application 800 updates records in the CRM system 240b. In one embodiment, the application 800 either writes new records to the CRM system 240b or updates existing records. In another embodiment, for each duplicate set, the application 800 inserts each final record that does not exist in the CRM system 240b according to its Final Record settings.

In one case, records that exist in the CRM system 240b are written according to their Final Record settings in each duplicate set. In another case, duplicate CRM records are deleted. In other embodiments, for non-duplicate records, the application 800 inserts each non-duplicate record from the CSV file 240a into the CRM system 240b. In one case, pre-existing CRM system data is not deleted. The user may run Clean-CRM 800 with the task Cleanse and de-duplicate your CRM system to remove these records. In another embodiment, then Contacts are inserted into the CRM system 240b, a new parent Account is also inserted into the CRM system. In one embodiment, the Account will be the Account Name that is specified for the Contact, and the new account will be associated with the inserted Contact.

In some embodiments, when cleansing and de-duping a CRM System 240b, for each duplicate set, the application retains the Master Record of the duplicate set if the application does the merging into the CRM 240b. In one embodiment, the application 800 updates the Master Record according to the Final Record settings. In other embodiments, the application 800 removes all other records in the duplicate set from the CRM system 240b unless removed from the duplicate set. In another embodiment, if the application 800 does not do the merging in the CRM 240b, only the Master Record is updated according to the Final Record settings. The remaining records in the duplicate set may remain unchanged. For non-duplicate records, the application 800 updates the records in the CRM system 240b according to their Final Record settings on the Merge Screen 235.

Figure 9A:
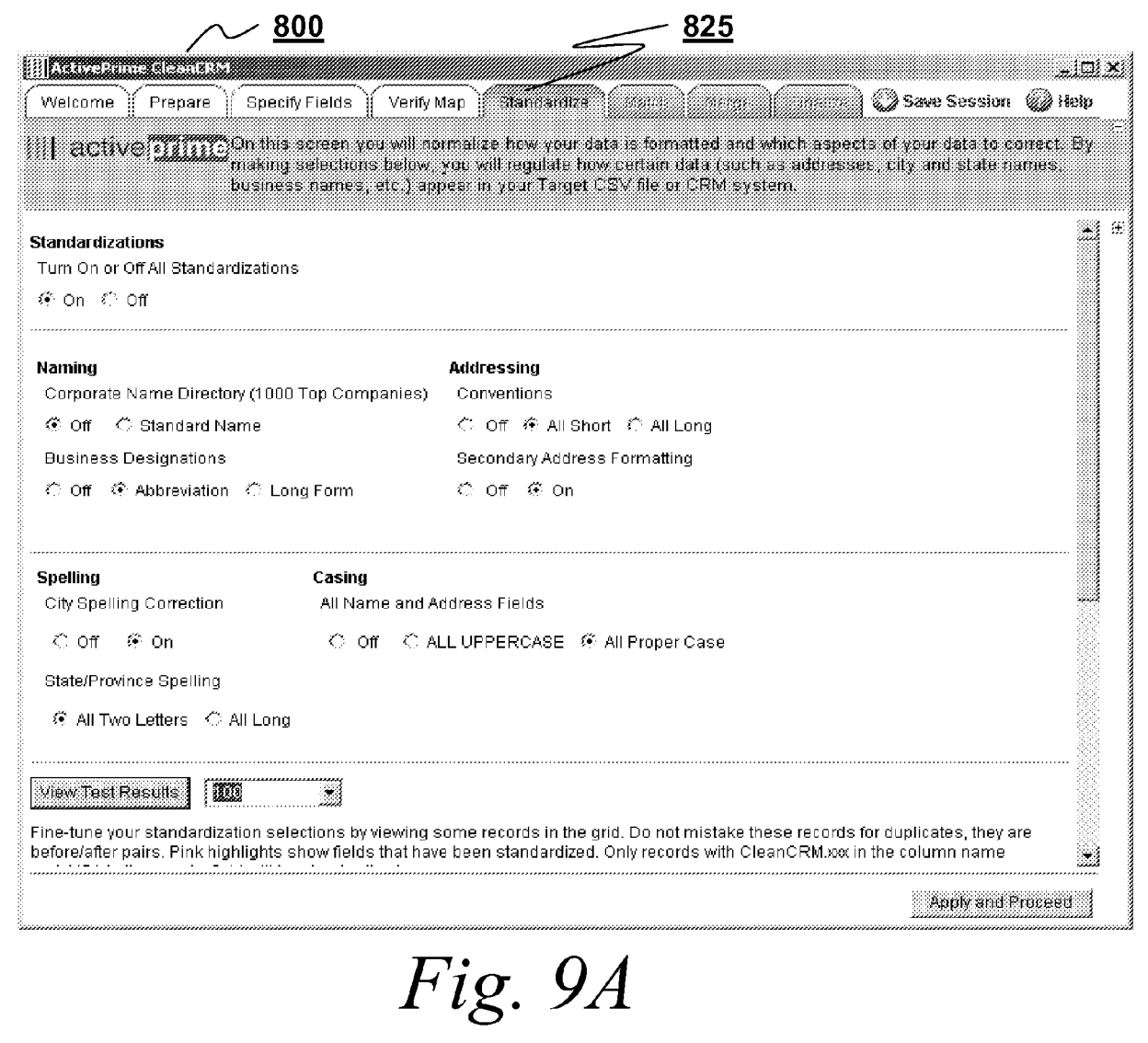

Referring now to FIG. 9A, another embodiment of the user interface of the Standardize Screen 825 for specifying standardized rules 260 is illustrated. In some embodiments, standardizations 260 are applied using a combination of domain knowledge as described in connection with FIG. 7 and inexact matching and inexact searching as described in connection with FIGS. 3-6. A subset of the records can be viewed on this screen by selecting the number of records to process and view and then selecting the "View Test Results" button. When the user is satisfied with the standardization settings, the Apply and Proceed button is selected to standardize all records and then display the next screen.

Figure 9B:
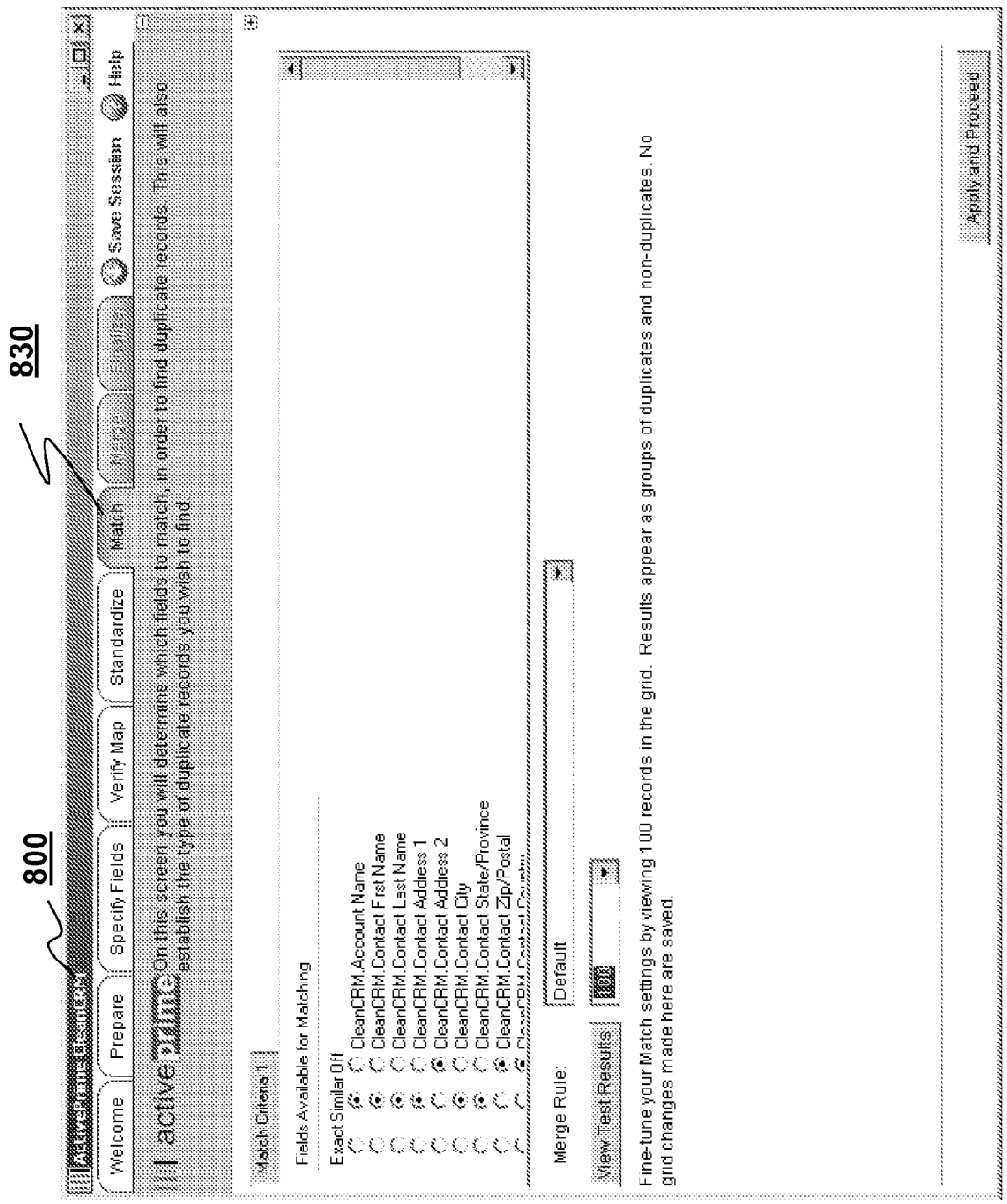
FIG. 9B is a diagrammatic view of a match criteria selection user interface for practicing another embodiment of the data conditioning framework.

Referring now to FIG. 9B, another embodiment of the user interface of the Match Screen 830 is depicted. In one embodiment, the user selects the match criteria 225 on this screen 830. In some embodiments, additional match criteria can be selected by clicking on the "Match Criteria" tab and selecting "add match criteria". Match criteria 225 can be removed by selecting "remove match criteria". In one embodiment, each match criteria 225 comprises a set of available fields to match on. In some embodiments, the user may select either "Exact", "Similar", or "Off" for each field. In another embodiment, a similar match on a field is defined as any two strings that are within a predefined threshold, such as a percentage or number of characters, of one another. In some embodiments, a predetermined threshold may be 20%. For example, the predetermined threshold of 20% indicates two strings can not have more than 20% difference. If the strings are S1 and S2, then if S1 is 10 characters long and S2 is 20 characters long, the shortest string is used to identify how many edits is 20%. In this case, 20% of 10 is 2 character edits. If S1 and S2 required 3 edits to make them the same, then they are not similar. If they require 2 or less edits, then they are similar. In other embodiments, the predetermined threshold may comprise 1%, 2%, 3%, 4%, 5%, 10%, 15%, 20%, 25%, 30%, 35%, 40%, 45%, or 50%. In another embodiment, the predetermined threshold may comprise any increment or interval in the range of 0% to 100%. In some embodiments, the predetermined threshold may be based on the first string, S1. In other embodiments, the predetermined threshold may be based on the first string, S2.

In the Match Screen 830, the user selects a number of records to process and the "View Test Results" button to perform matching on that subset of data. When the user is satisfied with the match criteria 225 settings, the user selects "Apply and Proceed" and all records are matched and the next screen is displayed. The "Merge Rule" selector illustrated in FIG. 9B allows the user to specify what type of merging behavior to apply when matches are found and then merged.

Figure 9C:
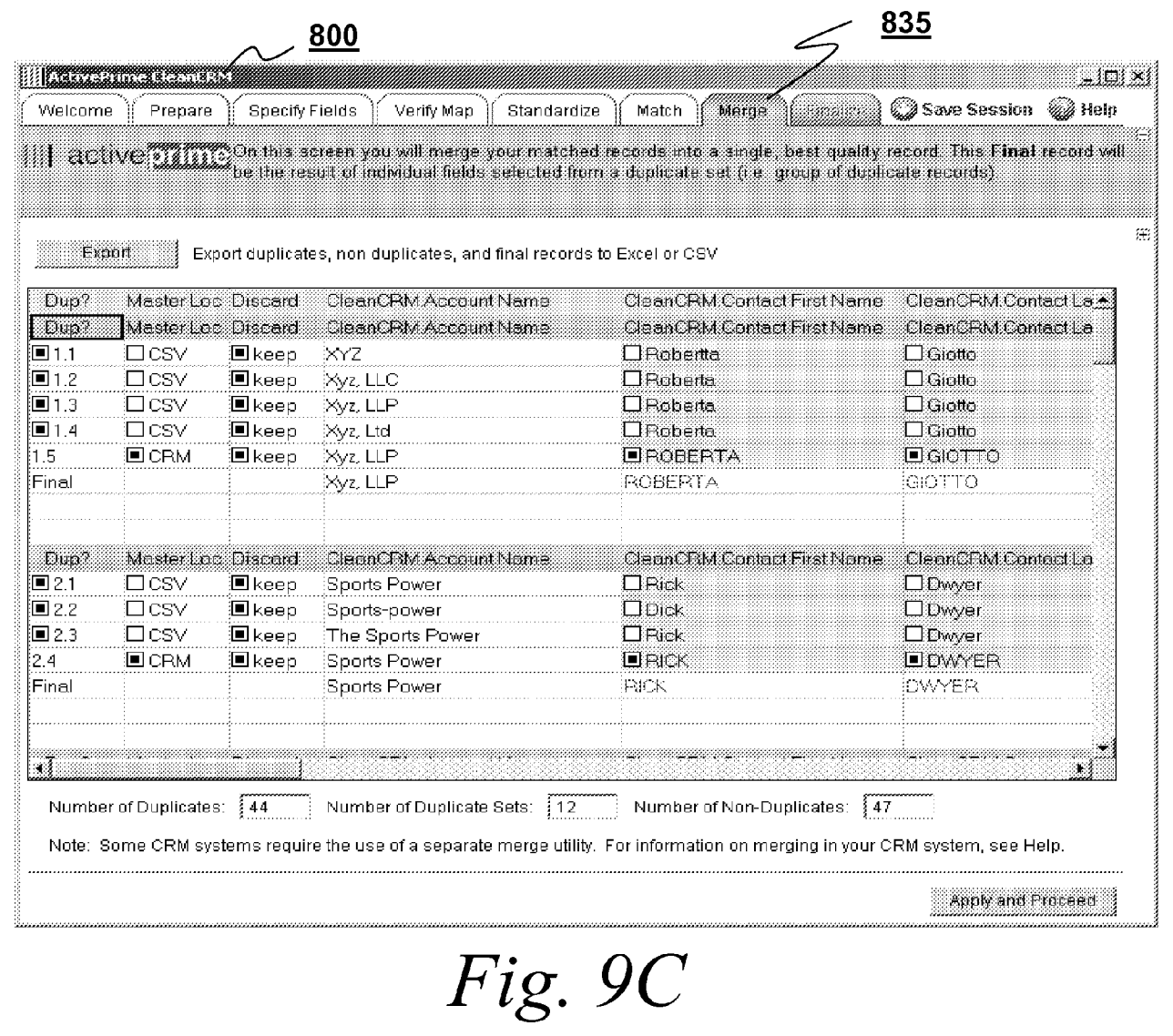

Referring now to FIG. 9C, another embodiment of the user interface of the Merge Screen 835 is depicted. In one embodiment, the Merge Screen 835 provides a user interface for managing identified duplicates. In some embodiments, one or more of the following user actions are supported: 1) view all duplicates, 2) view those records that compose each duplicate, 3) view final duplicate records after merging the duplicate records into one final record, 4) view the non-duplicate records, 5) per duplicate, select which record is the master 6) have all other records in that duplicate "folded" into the master by selecting the record's toggle button in the "Master Loc" column, 7) Per duplicate, edit fields in the master record, 8) Per duplicate, observe which fields have conflicting values, 9) Per duplicate, observe which fields have been standardized, 10) Select any conflicting field's value to be folded into the final record 11) remove a record from a duplicate by selecting it's toggle button in the "Dup?" column, 12) remove a record from further processing by selecting it's toggle button in the "Discard" column, 13) view the total number of duplicate records, duplicates, and non-duplicates, and 14) export the duplicates grid out to either Excel or CSV format.

In some embodiments, the CleanCRM application 800 stores various settings to a storage location and such setting can be loaded for another instance or run of the application. The following type of setting may exist: 1) session settings, 2) map settings and 3) user settings. In one embodiment, a session setting comprises storage of configuration for the work flow. The state of one or more user interfaces may be saved in session settings. For instance, what type of standardization 260 to perform, and what match criteria 225 to use, etc. The user can save/load session settings. In another embodiment, map setting comprises two types of maps: one for the Specify Map Screen and one for the Verify Map Screen. In one embodiment, the user can save/load maps. In other embodiments, the use settings comprise certain configurations in the application that are stored, automatically, or otherwise, for the user. In one embodiment, the use settings included storage of the state of the Banner and Instruction windows, which may have a maximized and minimized state.

Although the example CleanCRM application 800 using the data conditioning framework 120 is generally described in connection with cleansing a CRM system or CSV data, the data conditioning framework 120 and/or application 800 may be used to cleanse any type of data source or information system using any of the techniques described herein. For example, an application 800, having similar operations, structure and/or functionality of the illustrated CleanCRM, may be used to cleanse data related to any of the following types and forms of information systems, data sources, or data related thereto: 1) accounting or financial system, 2) manufacturing, 3) product data management, 4) product life cycle management, 5) enterprise resource planning, 6) supply chain, 7) lab information systems, 8) bioinformatics systems and 9) life sciences information systems.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

I claim:

1. A method for reducing a set of strings to approximately match to a first string by determining an edit distance between the first string and the set of strings is within a predetermined threshold, the method comprising:
   (a) receiving, by a device, a request to approximately match a first string with a set of strings using a predetermined edit distance;
   (b) generating, by a device, a difference histogram comprising a distribution of a difference in a first number of occurrences of each character of a character set in the first string of the request and a second number of occurrences of each character of the character set in a second string of the set of strings, by incrementing each cell in the difference histogram corresponding to each character in the first string by a positive value and decrementing each cell in the difference histogram corresponding to each character set in the second string by a negative value;
   (c) determining, by a device, via the difference histogram that a first sum of values across a plurality of cells of the difference histogram is greater than a predetermined threshold and that a second sum of negative values across a second plurality of cells of the difference histogram is less than a negative of the predetermined threshold; and
   (d) identifying, by the device, the second string as having an edit distance from the first string greater than the predetermined edit distance in response to the determination.

2. The method of claim 1, comprising skipping an approximate match of the first string to the second string in response to the determination.

3. The method of claim 1, comprising determining the first count and the second count are less than the predetermined threshold and performing an approximate match of the first string to the second string using the predetermined edit distance.

4. The method of claim 1, comprising terminating execution of an approximate match of the first string with a string of the set of strings upon an edit distance of the approximate match reaching the predetermined threshold.

5. The method of claim 1, wherein step(a) comprises determining the first string and the second string are the same and identifying the second string as having an edit distance of zero.

6. The method of claim 1, wherein one of the first string or the second string identify one of a person, an institute or a location.

7. The method of claim 1, wherein one of the first string or the second string represent data of one of the following systems: accounting, manufacturing, customer relationship management, enterprise resource planning, product data management, product lifecycle management, supply chain management, bioinformatics system or lab information management system.

8. The method of claim 1, wherein a character of one of the first string of the second string comprises one of a letter, a digit, or a symbol.

9. The method of claim 1, comprising setting one of the predetermined edit distance or the predetermined threshold based on a percentage of number of characters of the first string.

10. A system for reducing a set of strings to approximately match to a first string by determining an edit distance between the first string and the set of strings is within a predetermined threshold, the system comprising:
 a device receiving a request to approximately match a first string with a set of strings using a predetermined edit distance;
 an approximate matching engine executing on a processor of the device, generating a difference histogram comprising a distribution of a difference in a first number of occurrences of each character of a character set in the first string of the request and a second number of occurrences of each character of the character set in a second string of the set of strings, by incrementing each cell in the difference histogram corresponding to each character in the first string by a positive value and decrementing each cell in the difference histogram corresponding to each character set in the second string by a negative value; and
 and wherein the approximate matching engine identifies the second string as having an edit distance from the first string greater than the predetermined edit distance in response to determining that a first sum of values across a plurality of cells of the difference histogram is greater than a predetermined threshold and that a second sum of negative values across a second plurality of cells of the difference histogram is less than a negative of the predetermined threshold.

11. The system of claim 10, wherein the approximate matching engine skips an approximate match of the first string to the second string in response to the determination.

12. The system of claim 10, wherein the approximate matching engine determines the first count and the second count are less than the predetermined threshold and performs an approximate match of the first string to the second string using the predetermined edit distance.

13. The system of claim 10, wherein the approximate matching engine terminates execution of an approximate match of the first string with a string of the set of strings upon an edit distance of the approximate match reaching the predetermined threshold.

14. The system of claim 10, wherein the approximate matching engine determines the first string and the second string are the same and identifying the second string as having an edit distance of zero.

15. The system of claim 10, wherein one of the first string or the second string identify one of a person, an institute or a location.

16. The system of claim 10, wherein one of the first string or the second string represent data of one of the following systems: accounting, manufacturing, customer relationship management, enterprise resource planning, product data management, product lifecycle management, supply chain management, bioinformatics system or lab information management system.

17. The system of claim 10, wherein a character of one of the first string of the second string comprises one of a letter, a digit, or a symbol.

18. The system of claim 10, wherein one of the predetermined edit distance or the predetermined threshold is set based on a percentage of number of characters of the first string.

19. A method for reducing a set of strings to approximately match to a string, the method comprising:
 (a) receiving, by a device, a request to approximately match a first string to a plurality of strings;
 (b) determining, by the device, a first number of occurrences of each character of a character set in the first string;
 (c) determining, by the device, a second number of occurrences of each character of the character set in a second string of the plurality of strings;
 (d) generating, by the device based on the first number of occurrences minus the second number of occurrences for each character in the character set, a difference histogram comprising a difference in occurrence of each character in the character set between the first string and the second string by incrementing each cell in the difference histogram corresponding to each character in the first string by a positive value and decrementing each cell in the difference histogram corresponding to each character set in the second string by a negative value; and
 (e) skipping, by the device approximately matching the first string to the second string, responsive to determining via the difference histogram that a first sum of values across a plurality of cells of the difference histogram is less than a predetermined threshold and that a sum of negative values across a second plurality of cells of the difference histogram is less than a negative of the predetermined threshold.

* * * * *